United States Patent
Fujita

(10) Patent No.: US 10,632,368 B2
(45) Date of Patent: Apr. 28, 2020

(54) GAME CONTROLLER

(71) Applicant: NINTENDO CO., LTD., Kyoto (JP)

(72) Inventor: Kumpei Fujita, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 16/285,505

(22) Filed: Feb. 26, 2019

(65) Prior Publication Data

US 2019/0262702 A1     Aug. 29, 2019

(30) Foreign Application Priority Data

Feb. 27, 2018    (JP) ................................. 2018-032880

(51) Int. Cl.
| | |
|---|---|
| A63F 13/24 | (2014.01) |
| A63F 13/235 | (2014.01) |
| A63F 13/92 | (2014.01) |
| A63F 13/98 | (2014.01) |
| A63F 13/213 | (2014.01) |

(52) U.S. Cl.
CPC ............ *A63F 13/24* (2014.09); *A63F 13/235* (2014.09); *A63F 13/92* (2014.09); *A63F 13/98* (2014.09); *A63F 13/213* (2014.09); *A63F 2300/1025* (2013.01); *A63F 2300/1043* (2013.01); *A63F 2300/204* (2013.01)

(58) Field of Classification Search
CPC ......... A63F 13/06; A63F 13/24; A63F 13/211
See application file for complete search history.

(56) References Cited

U.S. PATENT DOCUMENTS

| | | | | |
|---|---|---|---|---|
| 5,615,083 A | * | 3/1997 | Burnett ................. | G05G 9/047 345/161 |
| 5,645,277 A | * | 7/1997 | Cheng .................... | A63F 13/06 273/148 B |
| 5,865,546 A | * | 2/1999 | Ganthier ............... | G06F 3/0202 341/22 |

(Continued)

FOREIGN PATENT DOCUMENTS

| | | |
|---|---|---|
| CN | 104436646 | 3/2015 |
| EP | 3 103 532 | 12/2016 |

(Continued)

OTHER PUBLICATIONS

Extended European Search Report dated Jun. 18, 2019 issued in corresponding EP No. 19159559.4 (6 pages).

*Primary Examiner* — Reginald A Renwick
(74) *Attorney, Agent, or Firm* — Nixon & Vanderhye PC

(57) ABSTRACT

An example of a game controller is removably attachable to a main unit having a main unit-side slide member and configured to execute game processes. The game controller includes: an operation section; and a controller-side slide member configured to slidably engage with the main unit-side slide member in a slide direction. The controller-side slide member has a first end and a second end in the slide direction, and the game controller is configured to be attached to the main unit by inserting the controller-side slide member into the main unit-side slide member from the first end. The controller-side slide member includes: a fixed portion that protrudes from a surface of the game controller and is fixed to the surface; and a pivoting portion that is connected to the fixed portion and is configured to pivot relative to the fixed portion.

30 Claims, 26 Drawing Sheets

(56) References Cited

U.S. PATENT DOCUMENTS

| | | | | |
|---|---|---|---|---|
| 5,896,125 A * | 4/1999 | Niedzwiecki | ........... | A63F 13/02 345/168 |
| 6,163,326 A * | 12/2000 | Klein | ........... | G06F 1/1616 345/156 |
| 6,266,234 B1 * | 7/2001 | Leman | ........... | G06F 1/1615 312/208.4 |
| 6,525,715 B2 * | 2/2003 | Uchiyama | ........... | G06F 1/1626 345/169 |
| 6,530,838 B2 * | 3/2003 | Ha | ........... | A63F 13/06 463/36 |
| 6,697,251 B1 * | 2/2004 | Aisenberg | ........... | G06F 1/1616 248/118.1 |
| 6,727,890 B2 * | 4/2004 | Andres | ........... | G06F 3/0202 341/22 |
| D492,294 S * | 6/2004 | Kim | ........... | A63F 13/92 D14/240 |
| 6,788,285 B2 * | 9/2004 | Paolucci | ........... | G06F 1/1626 200/176 |
| D500,319 S * | 12/2004 | Wada | ........... | D14/401 |
| 6,903,662 B2 * | 6/2005 | Rix | ........... | G06F 3/0202 340/10.6 |
| 7,095,442 B2 * | 8/2006 | van Zee | ........... | G06F 1/1626 348/333.01 |
| D544,481 S * | 6/2007 | Maddox | ........... | D14/240 |
| 7,436,149 B2 * | 10/2008 | Luo | ........... | G06F 3/0231 320/115 |
| 7,479,943 B1 * | 1/2009 | Lunsford | ........... | G06F 3/0224 345/157 |
| 7,717,782 B2 * | 5/2010 | Van Luchene | ........ | A63F 13/822 463/9 |
| 7,733,637 B1 * | 6/2010 | Lam | ........... | G06F 1/1626 361/679.08 |
| D656,554 S * | 3/2012 | Mar | ........... | D21/324 |
| 8,206,220 B2 * | 6/2012 | Young | ........... | A63F 13/06 463/37 |
| 8,360,882 B2 * | 1/2013 | Liu | ........... | A63F 13/06 463/37 |
| 8,469,808 B2 * | 6/2013 | Longman | ........... | G06F 3/0219 463/36 |
| 8,547,340 B2 * | 10/2013 | Sizelove | ........... | B64D 11/0015 345/173 |
| 8,560,752 B2 * | 10/2013 | Liberty | ........... | G06F 1/1632 463/37 |
| 8,630,088 B2 * | 1/2014 | Collopy | ........... | G06F 1/1616 361/679.55 |
| 8,858,335 B2 * | 10/2014 | Helmes | ........... | A63F 13/06 463/37 |
| 8,898,567 B2 * | 11/2014 | Arrasvuori | ........... | G06F 1/1626 715/704 |
| 8,944,912 B2 * | 2/2015 | Joynes | ........... | G06F 3/0219 361/679.11 |
| 8,972,617 B2 * | 3/2015 | Hirschman | ........... | G06F 13/102 710/8 |
| 9,118,750 B2 * | 8/2015 | Vossoughi | ........... | B60R 11/02 |
| 9,220,453 B2 * | 12/2015 | Roots | ........... | A61B 5/168 |
| 9,711,980 B2 * | 7/2017 | Hodges | ........... | G06F 1/1632 |
| 9,717,155 B1 * | 7/2017 | Lin | ........... | H04B 1/3877 |
| 2001/0045938 A1 * | 11/2001 | Willner | ........... | A63F 13/06 345/156 |
| 2003/0075603 A1 * | 4/2003 | Rudduck | ........... | A47F 7/024 235/385 |
| 2003/0095110 A1 * | 5/2003 | Ukita | ........... | G06F 1/1616 345/173 |
| 2004/0186935 A1 * | 9/2004 | Bell | ........... | G06F 1/1626 710/72 |
| 2005/0248526 A1 * | 11/2005 | Twerdahl | ........... | G06F 3/038 345/156 |
| 2006/0197753 A1 * | 9/2006 | Hotelling | ........... | G06F 1/169 345/173 |
| 2006/0252537 A1 * | 11/2006 | Wu | ........... | A63F 13/06 463/36 |
| 2006/0256090 A1 * | 11/2006 | Huppi | ........... | A63F 13/02 345/173 |
| 2007/0035917 A1 * | 2/2007 | Hotelling | ........... | G06F 1/1632 361/679.56 |
| 2007/0045392 A1 * | 3/2007 | Youens | ........... | G06F 1/1632 235/145 R |
| 2007/0178966 A1 * | 8/2007 | Pohlman | ........... | A63F 13/06 463/36 |
| 2007/0218988 A1 * | 9/2007 | Lucich | ........... | A63F 13/00 463/30 |
| 2009/0005164 A1 * | 1/2009 | Chang | ........... | A63F 13/06 463/37 |
| 2009/0163241 A1 * | 6/2009 | Vossoughi | ........... | H04M 1/0254 455/556.1 |
| 2009/0210101 A1 * | 8/2009 | Hawkins | ........... | A63F 9/04 700/297 |
| 2009/0273560 A1 * | 11/2009 | Kalanithi | ........... | G06F 3/002 345/156 |
| 2010/0041451 A1 * | 2/2010 | Washiyama | ........... | G06F 1/1622 455/575.4 |
| 2010/0048276 A1 * | 2/2010 | Wang | ........... | A63F 3/00176 463/14 |
| 2010/0081505 A1 * | 4/2010 | Alten | ........... | G06F 1/1632 463/36 |
| 2011/0156640 A1 * | 6/2011 | Moshfeghi | ........... | H02J 50/20 320/108 |
| 2011/0230178 A1 * | 9/2011 | Jones | ........... | H04M 1/0235 455/422.1 |
| 2011/0260969 A1 * | 10/2011 | Workman | ........... | A63F 13/24 345/161 |
| 2012/0058821 A1 * | 3/2012 | Lan | ........... | A63F 13/24 463/30 |
| 2012/0113034 A1 * | 5/2012 | McDermid | ........... | G06F 1/1626 345/173 |
| 2012/0142419 A1 * | 6/2012 | Muramatsu | ........... | A63F 13/24 463/37 |
| 2012/0282987 A1 * | 11/2012 | Romero | ........... | G06F 3/041 463/5 |
| 2012/0302347 A1 * | 11/2012 | Nicholson | ........... | A63F 13/24 463/37 |
| 2012/0303476 A1 * | 11/2012 | Krzyzanowski | ........... | G06F 8/60 705/26.5 |
| 2013/0095925 A1 * | 4/2013 | Xu | ........... | G06F 1/1626 463/37 |
| 2013/0109476 A1 * | 5/2013 | Baum | ........... | A63F 13/92 463/37 |
| 2013/0267322 A1 * | 10/2013 | South | ........... | A63F 13/06 463/38 |
| 2014/0101561 A1 * | 4/2014 | Moon | ........... | H04M 1/7253 715/738 |
| 2014/0184508 A1 * | 7/2014 | Tamasi | ........... | G06F 1/1632 345/161 |
| 2014/0221098 A1 * | 8/2014 | Boulanger | ........... | G06F 1/1684 463/37 |
| 2014/0274394 A1 * | 9/2014 | Willis | ........... | G06F 1/1632 463/37 |
| 2014/0339110 A1 * | 11/2014 | Soracco | ........... | A63B 71/0619 206/315.3 |
| 2015/0331463 A1 * | 11/2015 | Obie | ........... | G06F 1/1632 713/300 |
| 2016/0149426 A1 * | 5/2016 | Hodges | ........... | G06F 1/1632 320/108 |
| 2016/0266606 A1 * | 9/2016 | Ricci | ........... | G06F 1/163 |
| 2016/0361633 A1 | 12/2016 | Fujita et al. | | |
| 2016/0361641 A1 | 12/2016 | Koizumi et al. | | |
| 2017/0151483 A1 * | 6/2017 | Binder | ........... | H02J 7/0068 |
| 2017/0182375 A1 * | 6/2017 | Binder | ........... | G08B 5/36 |
| 2018/0099225 A1 | 4/2018 | Furuike et al. | | |

FOREIGN PATENT DOCUMENTS

| | | |
|---|---|---|
| JP | 2017-004523 | 1/2017 |
| JP | 6153238 | 6/2017 |

* cited by examiner

GAME CONTROLLER

CROSS REFERENCE TO RELATED APPLICATION

The disclosure of Japanese Patent Application No. 2018-32880 filed on Feb. 27, 2018 is incorporated herein by reference.

FIELD

The present technique relates to a game controller.

BACKGROUND AND SUMMARY

There is a conventional technique for use in a game system including a main body apparatus and a game controller, wherein the main body apparatus and the game controller are connected together by using a slide mechanism.

With the conventional technique, the game controller includes a rail for the attachment of the game controller to the main body apparatus. With the conventional technique, there is a limitation on the shape of the game controller so that the shape conforms to the rail. Therefore, there is room for improvement in terms of the freedom in designing the game controller.

Thus, the present application discloses a game controller, with which it is possible to improve the shape-related design freedom.

(1)

An example game controller described herein is removably attachable to a main unit having a main unit-side slide member and configured to execute game processes. The game controller includes an operation section and a controller-side slide member. The controller-side slide member is configured to slidably engage with the main unit-side slide member in a slide direction. The controller-side slide member has a first end and a second end in the slide direction. The game controller is configured to be attached to the main unit by inserting the controller-side slide member into the main unit-side slide member from the first end. The controller-side slide member includes a fixed portion and a pivoting portion. The fixed portion protrudes from a surface of the game controller and is fixed to the surface. The pivoting portion is connected to the fixed portion and is configured to pivot relative to the fixed portion.

With configuration (1) above, since the pivoting portion, which is a portion of the controller-side slide member, is configured to pivot, it is possible to change the shape of the controller-side slide member (in other words, the orientation of the pivoting portion relative to the fixed portion). The design of the shape of the game controller is restricted by the shape of the controller-side slide member. With configuration (1) above, however, it is possible to improve the degree of freedom in designing the shape of the controller-side slide member, and it is therefore possible to improve the degree of freedom in designing the shape of the game controller.

(2)

The pivoting portion may be configured to pivot to a first position in which a slide axis of the pivoting portion is substantially on the same straight line with a slide axis of the fixed portion.

With configuration (2) above, the slide axis of the fixed portion and the slide axis of the pivoting portion can be aligned on the same straight line, and it is possible to smoothly attach the controller-side slide member to the main unit-side slide member.

(3)

The pivoting portion may be configured to pivot to a first position in which the fixed portion and the pivoting portion are configured to engage at the same time with the main unit-side slide member.

With configuration (3) above, the fixed portion and the pivoting portion can be simultaneously attached to the main unit-side slide member, and it is therefore possible to attach the controller-side slide member to the main unit-side slide member.

(4)

The pivoting portion may be configured to pivot over a range including an extent from the first position to a second position in which the slide axis of the pivoting portion is inclined relative to the slide axis of the fixed portion. The game controller may further include a biasing portion that biases the pivoting portion in one of a pivoting direction from the first position toward the second position and a pivoting direction from the second position toward the first position.

With configuration (4) above, the pivoting portion is configured to pivot over the range including the first position and the second position, and the pivoting portion can be biased by the biasing portion in the pivoting direction from the first position toward the second position or in the pivoting direction from the second position toward the first position.

(5)

The pivoting portion may be configured to pivot over a range including an extent from the first position to a second position in which the slide axis of the pivoting portion forms an angle other than a straight angle relative to the slide axis of the fixed portion. The game controller may further include a biasing portion that biases the pivoting portion in a pivoting direction from the first position toward the second position or in a pivoting direction from the second position toward the first position.

With configuration (5) above, the pivoting portion is configured to pivot over the range including the first position and the second position, and the pivoting portion can be biased by the biasing portion in the pivoting direction from the first position toward the second position or in the pivoting direction from the second position toward the first position.

(6)

The game controller may further include a holding portion that holds the pivoting portion in a hold position.

With configuration (6) above, the pivoting portion is held in the hold position by the holding portion, and it is therefore possible to reduce the possibility that the pivoting portion may freely pivot and flap around in a state where the game controller is removed from the main unit.

(7)

The game controller may further include a holding portion that holds the pivoting portion in a second position in which a slide axis of the pivoting portion is inclined relative to a slide axis of the fixed portion.

With configuration (7) above, in a state where the game controller is removed from the main unit, the pivoting portion can be held in the second position, and it is possible to reduce the possibility that the pivoting portion may freely pivot and flap around.

(8)

The game controller may further include a holding portion that holds the pivoting portion in a second position in which a slide axis of the pivoting portion forms an angle other than a straight angle relative to a slide axis of the fixed portion.

With configuration (8) above, in a state where the game controller is removed from the main unit, the pivoting portion can be held in the second position, and it is possible to reduce the possibility that the pivoting portion may freely pivot and flap around.

(9)

The game controller may further include a first restricting portion that restricts the pivot of the pivoting portion at a second position in which a slide axis of the pivoting portion is inclined relative to a slide axis of the fixed portion.

With configuration (9) above, it is possible to reduce the possibility that the pivoting portion may pivot past the second position.

(10)

The game controller may further include a second restricting portion that restricts the pivot of the pivoting portion at a first position in which a slide axis of the pivoting portion is substantially on the same straight line with a slide axis of the fixed portion.

With configuration (10) above, it is possible to reduce the possibility that the pivoting portion may pivot past the first position.

(11)

The surface from which the fixed portion protrudes may be a side surface of a body section of the game controller. The front surface of the body section includes a first plane and a second plane. The operation section is provided on the first plane. The second plane is not parallel to the first plane.

With configuration (11) above, it is possible to make it easier to hold the body section.

(12)

The connecting portion between the fixed portion and the pivoting portion may be at a position corresponding to a boundary portion between the first plane and the second plane in the slide direction.

With configuration (12) above, since the pivoting portion pivots about the boundary portion being the axis, the pivoting portion can be placed along the first plane.

(13)

The fixed portion may be on a side surface, of the side surface of the body section, that is located on a side of the second plane. The slide axis of the fixed portion and the second plane are substantially parallel to each other. The pivoting portion is along a side of the first plane. The pivoting portion is configured to pivot between a first position and a third position. The first position is a position in which a slide axis of the pivoting portion is substantially on the same straight line with a slide axis of the fixed portion. The third position is a position that is reached when the pivoting portion pivots in such a direction that an amount by which the pivoting portion protrudes from the first plane of the body section decreases from an amount of protrusion of the pivoting portion in the first position.

With configuration (13) above, the game controller can be attached to the main unit by bringing the pivoting portion into the first position, and it is possible to ensure that the pivoting portion is unlikely to hinder the user by bringing the pivoting portion into the third position.

(14)

The third position may be a position in which the pivoting portion is on a back surface side relative to the first plane of the body section.

With configuration (14) above, the pivoting portion can be pivoted to the third position in which it is more unlikely to hinder the user.

(15)

The surface from which the fixed portion protrudes may be a side surface of a body section of the game controller. A front surface of the body section may be bent or curved. The operation section may be on the front surface of the body section.

With configuration (15) above, it is possible to make it easier to hold the body section.

(16)

A connecting portion between the fixed portion and the pivoting portion may be at a position corresponding to a portion in the slide direction at which the body section is bent or curved.

With configuration (16) above, since the pivoting portion pivots about the bent/curved portion being the axis, the pivoting portion can be placed along the front surface of the body section.

(17)

The surface from which the fixed portion protrudes may be a side surface of the body section of the game controller. The front surface of the body section may include an upwardly-protruding curved surface on which an operation section is provided.

With configuration (17) above, it is possible to make it easier to hold the body section.

(18)

The fixed portion may be on a side surface, of the side surface of the body section, that is located on a side of the second plane. A slide axis of the fixed portion and the second plane are substantially parallel to each other.

With configuration (18) above, since the slide axis of the fixed portion and the second surface of the body section are substantially parallel to each other, the user can easily attach the game controller to the main unit by holding the second surface and moving the game controller in the slide direction of the first rail portion.

(19)

The fixed portion may be on a back surface side relative to the front surface of the body section.

With configuration (19) above, since the fixed portion does not protrude relative to the front surface of the body section, the fixed portion is unlikely to hinder the user when the user holds the body section.

(20)

The pivoting portion may be configured to pivot between a first position and a fourth position. The first position is a position in which a slide axis of the pivoting portion is substantially on the same straight line with a slide axis of the fixed portion. The fourth position is a position that is reached when the pivoting portion pivots in such a direction that an amount by which the pivoting portion protrudes from the front surface of the body section decreases from an amount of protrusion of the pivoting portion in the first position.

With configuration (20) above, the game controller can be attached to the main unit by bringing the pivoting portion into the first position, and it is possible to ensure that the pivoting portion is unlikely to hinder the user by bringing the pivoting portion into the fourth position.

(21)

The fourth position may be a position in which the pivoting portion is on a back surface side relative to the front surface of the body section.

With configuration (21) above, the pivoting portion can be pivoted to the fourth position in which it is more unlikely to hinder the user.

(22)

The pivoting portion may be configured to pivot about an axis that is substantially perpendicular to the surface from which the fixed portion protrudes.

With configuration (22) above, since the pivoting portion is configured to pivot about an axis that is substantially perpendicular to the surface from which the fixed portion protrudes, it is possible to improve the degree of freedom in designing the shape of the game controller with respect to the pivot direction.

(23)

The controller-side slide member may further include a shaft on an end portion of the fixed portion in the slide direction. The pivoting portion may be configured to pivot about the shaft.

With configuration (23) above, the pivoting portion can be pivoted about the end portion of the fixed portion.

(24)

The operation section may be a direction input section with which it is possible to make direction inputs.

With configuration (24) above, it is possible to improve the degree of freedom in designing the shape of the game controller including the direction input section.

(25)

The game controller may further include a stop member on the pivoting portion that resists a slide movement of the controller-side slide member against the main unit-side slide member in a direction opposite to a direction in which the controller-side slide member is inserted into the main unit-side slide member when the controller-side slide member has been inserted up to a predetermined position into the main unit-side slide member.

With configuration (25) above, it is possible to reduce the possibility that the game controller attached to the main unit may come off the main unit.

(26)

The game controller may further include a movable member on the pivoting portion that is configured to be moved by an operation by a user, wherein the stop member is moved from a fourth position to a fifth position in response to the movable member being operated by the user. The stop member in the fourth position may be more protruding from at least one of the surface, from which the fixed portion protrudes, of the game controller and a side surface of the controller-side slide member as compared with the stop member in the fifth position. The stop member may be biased toward a protruding state in the fourth position.

With configuration (26) above, the user can operate the movable member to move the stop member to the fifth position, thereby making it easier to remove the game controller from the main unit.

(27)

The game controller may further include an operation section provided on the pivoting portion.

With configuration (27) above, it is possible to efficiently use the space on the game controller, and operation buttons can be efficiently arranged on the game controller.

(28)

The fixed portion may be on a side of the first end of the controller-side slide member, and the pivoting portion is on a side of the second end of the controller-side slide member. The fixed portion may include a protruding portion protruding in the slide direction from the side of the first end of the fixed portion and having a facing surface that faces the surface, from which the fixed portion protrudes, of the game controller. The game controller may further include at least one terminal between the facing surface and the surface from which the fixed portion protrudes. The terminal is configured to be electrically connected to the main unit.

With configuration (28) above, since the terminal is arranged with the side thereof that faces the body section being exposed, it is possible to reduce the possibility that the terminal may come into contact with a hand of the user or other objects, thereby protecting the terminal.

(29)

The fixed portion may be on a side of the second end of the controller-side slide member, and the pivoting portion is on a side of the first end of the controller-side slide member. The pivoting portion may include a protruding portion protruding in the slide direction from the side of the second end of the pivoting portion and having a facing surface that faces the surface, from which the fixed portion protrudes, of the game controller. The game controller may further include at least one terminal between the opposing surface and the surface from which the fixed portion protrudes. The terminal is configured to be electrically connected to the main unit.

With configuration (29) above, since the terminal is arranged with the side thereof that faces the body section being exposed, it is possible to reduce the possibility that the terminal may come into contact with a hand of the user or other objects, thereby protecting the terminal.

(30)

The terminal may be such that at least a part thereof lies in a slit provided on the opposing surface.

With configuration (30) above, the terminal can be more efficiently protected by providing the terminal in the slit.

(31)

The surface from which the fixed portion protrudes may be a side surface of the body section of the game controller. The reverse surface of the body section may include a first surface, and a protruding second surface that protrudes from the first surface and that is configured to be held by a hand of the user.

With configuration (31) above, it is possible to make it easier to hold the body section.

(32)

Another example game controller described herein is removably attachable to a main unit having a main unit-side slide member and configured to execute game processes. The game controller includes an operation section and a controller-side slide member. The controller-side slide member is protruding from a surface of the game controller and is configured to slidably engage with the main unit-side slide member in a slide direction. The controller-side slide member has a first end and a second end in the slide direction. The game controller is configured to be attached to the main unit by inserting the controller-side slide member into the main unit-side slide member from the first end. The surface is a side surface of a body section of the game controller. The front surface of the body section includes a first surface and a second surface. The operation section is provided on the first surface. The second surface is not parallel to the first surface. A portion of the controller-side slide member protrudes past the front surface of the body section as seen from a direction perpendicular to the side surface.

With configuration (32) above, it is possible to make it easier to hold the body section, and it is possible to provide a game controller that can be held easily.

(33)

Another example game controller described herein is removably attachable to a main unit having a main unit-side slide member and configured to execute game processes. The game controller includes an operation section and a controller-side slide member. The controller-side slide member is protruding from a surface of the game controller and is configured to slidably engage with the main unit-side slide member in a slide direction. The controller-side slide member has a first end and a second end in the slide direction. The game controller is configured to be attached to the main unit by inserting the controller-side slide member into the main unit-side slide member from the first end. The surface is a side surface of a body section of the game controller. A front surface of the body section includes an upwardly-protruding curved surface on which the operation section is provided. A portion of the controller-side slide member protrudes past the front surface of the body section as seen from a direction perpendicular to the side surface.

With configuration (33) above, it is possible to make it easier to hold the body section, and it is possible to provide a game controller that can be held easily.

(34)

Another example game controller described herein is removably attachable to a main unit having a main unit-side slide member and configured to execute game processes. The game controller includes an operation section and a controller-side slide member. The controller-side slide member is protruding from a slide member-receiving surface of the game controller and is configured to slidably engage with the main unit-side slide member in a slide direction. The controller-side slide member has a first end and a second end in the slide direction. The game controller is configured to be attached to the main unit by inserting the controller-side slide member into the main unit-side slide member from the first end. The slide member-receiving surface is a side surface of a body section of the game controller. The front surface of the body section includes a first surface and a second surface. The operation section is provided on the first surface. The second surface is not parallel to the first surface. A reverse surface of the body section includes a third surface and an upwardly-protruding fourth surface. The fourth surface protrudes from the third surface and is configured to be held by a hand of a user.

With configuration (34) above, it is possible to make it easier to hold the front surface and the reverse surface of the body section, and it is possible to provide a game controller that can be held easily.

Note that the present specification discloses an example of a game system including the game controller and the main unit.

With the game controller, it is possible to improve the degree of freedom in designing the shape of the game controller.

These and other objects, features, aspects and advantages will become more apparent from the following detailed description when taken in conjunction with the accompanying drawings.

DETAILED DESCRIPTION OF NON-LIMITING EXAMPLE EMBODIMENTS

A game system according to an example of an exemplary embodiment is described below. An example of a game system 1 according to the exemplary embodiment includes a main body apparatus (an information processing apparatus; which functions as a game apparatus main body in the exemplary embodiment) 2, a first left controller 3, and a first right controller 4. Each of a first left controller 3 and a first right controller 4 is attachable to and detachable from the main body apparatus 2. That is, the game system 1 can be used as a unified apparatus obtained by attaching each of the first left controller 3 and the first right controller 4 to the main body apparatus 2. Further, in the game system 1, the main body apparatus 2, the first left controller 3, and the first right controller 4 can also be used as separate bodies (see FIG. 2).

Figure 11:
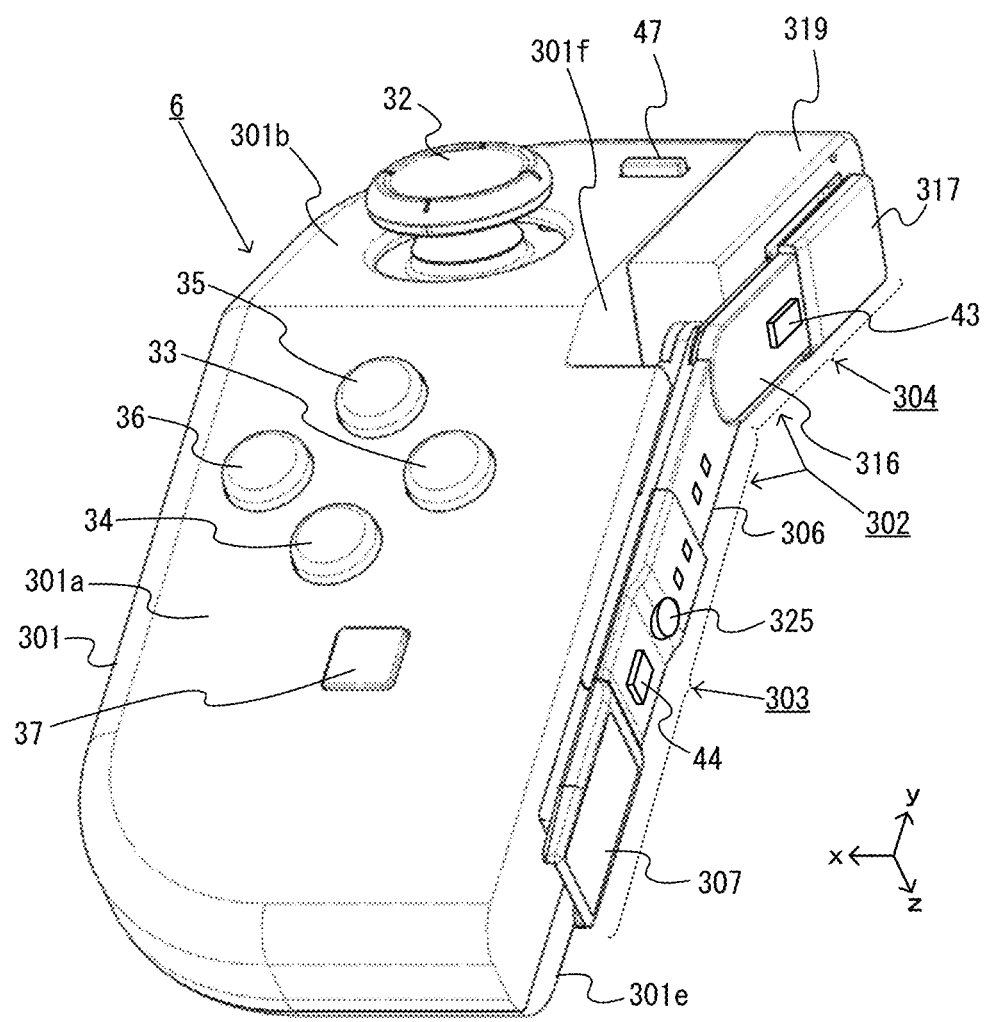
FIG. 11 is a diagram showing an example of a non-limiting second left controller.
Figure 12:
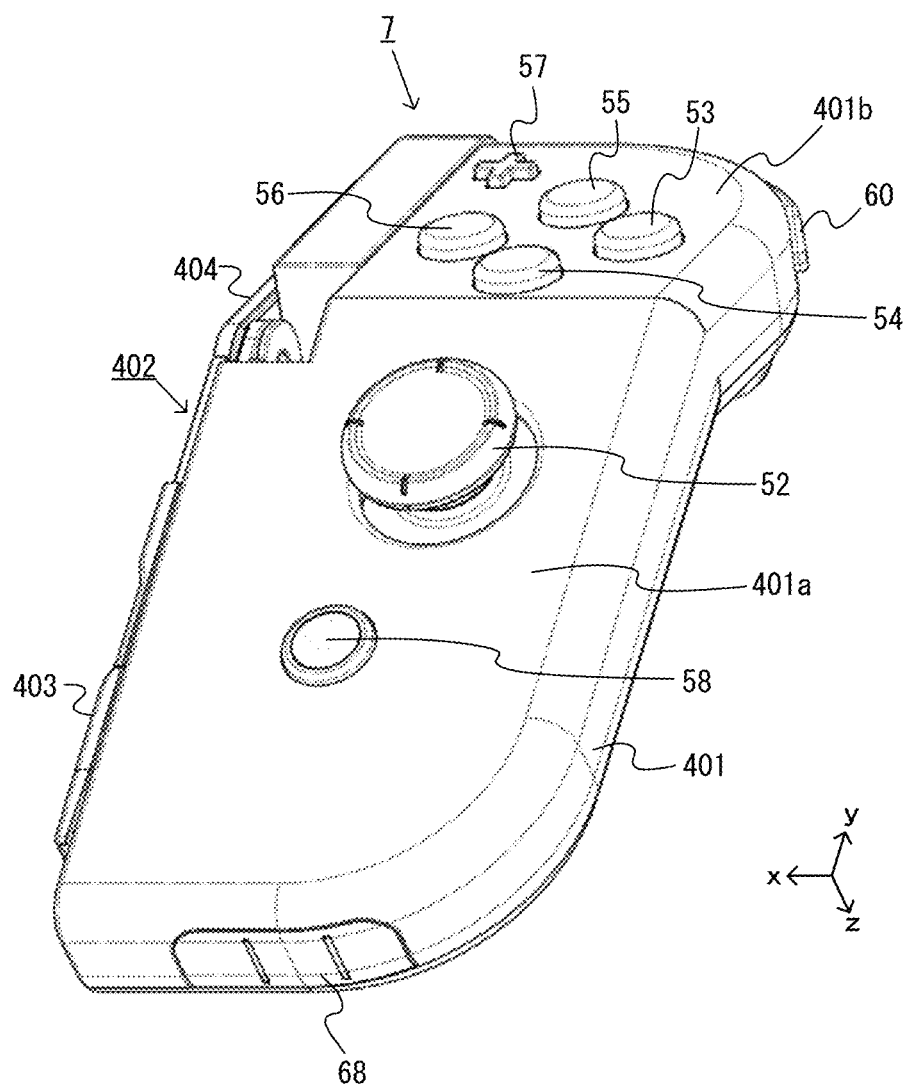
FIG. 12 is a diagram showing an example of a non-limiting second right controller.

Moreover, according to the present embodiment, the game system includes a second left controller 6 and a second right controller 7 to be described later (FIG. 11 and FIG. 12). In the present embodiment, the second left controller 6, instead of the first left controller 3, can be attached to the main body apparatus 2, and the second right controller 7, instead of the first right controller 4, can be attached to the main body apparatus 2. The second left controller 6 and the second right controller 7 will be described later.

Note that in the present specification, the first left controller 3, the first right controller 4, the second left controller 6 and the second right controller 7 may be referred to collectively as the "controller". The first left controller 3 and the first right controller 4 may be referred to collectively as the "first controller", and the second left controller 6 and the second right controller 7 may be referred to collectively as the "second controller".

[1. Configuration of Main Body Apparatus and Each of the First Controller]

Figure 1:
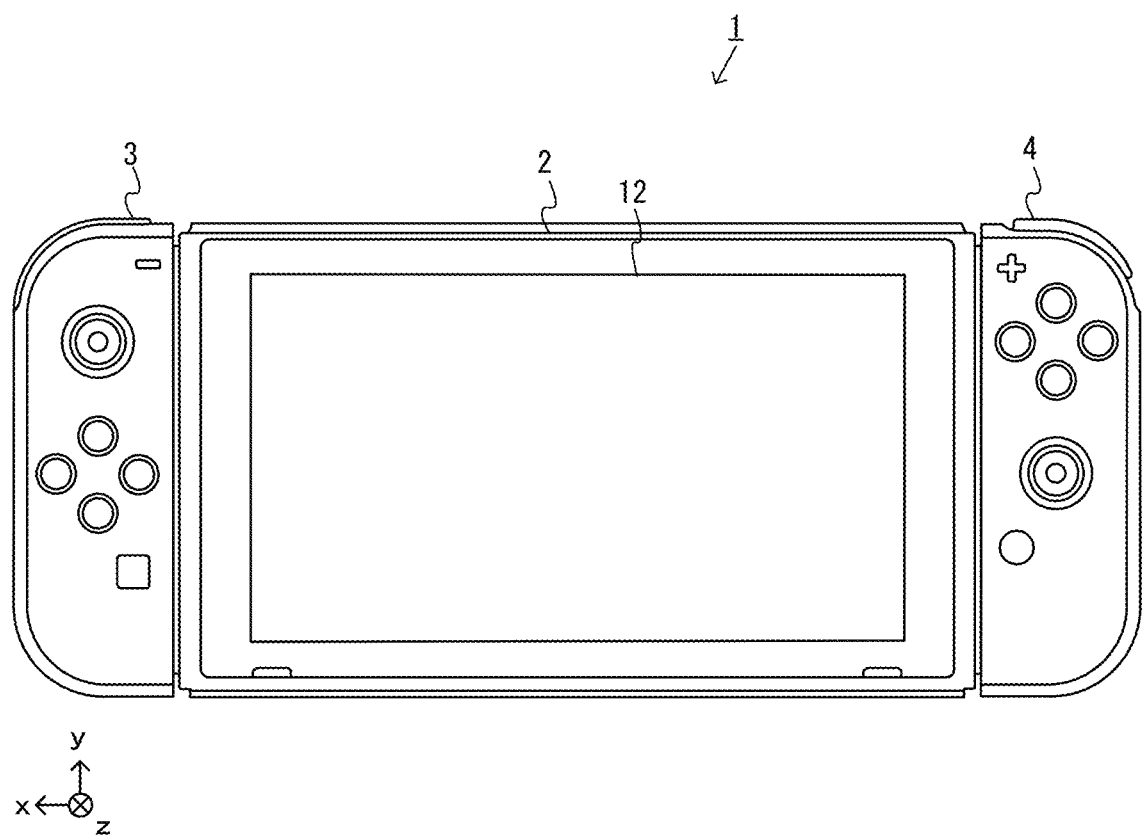
FIG. 1 is a diagram showing an example of the state where a non-limiting first left controller and a non-limiting first right controller are attached to a non-limiting main body apparatus.

FIG. 1 is a diagram showing an example of the state where the first left controller 3 and the first right controller 4 are attached to the main body apparatus 2. As shown in FIG. 1, each of the first left controller 3 and the first right controller 4 is attached to and unified with the main body apparatus 2. The main body apparatus 2 is an apparatus for performing various processes (e.g., game processing) in the game system 1. The main body apparatus 2 includes a display 12. Each of the first left controller 3 and the first right controller 4 is an apparatus including operation sections with which a user provides inputs.

Figure 2:
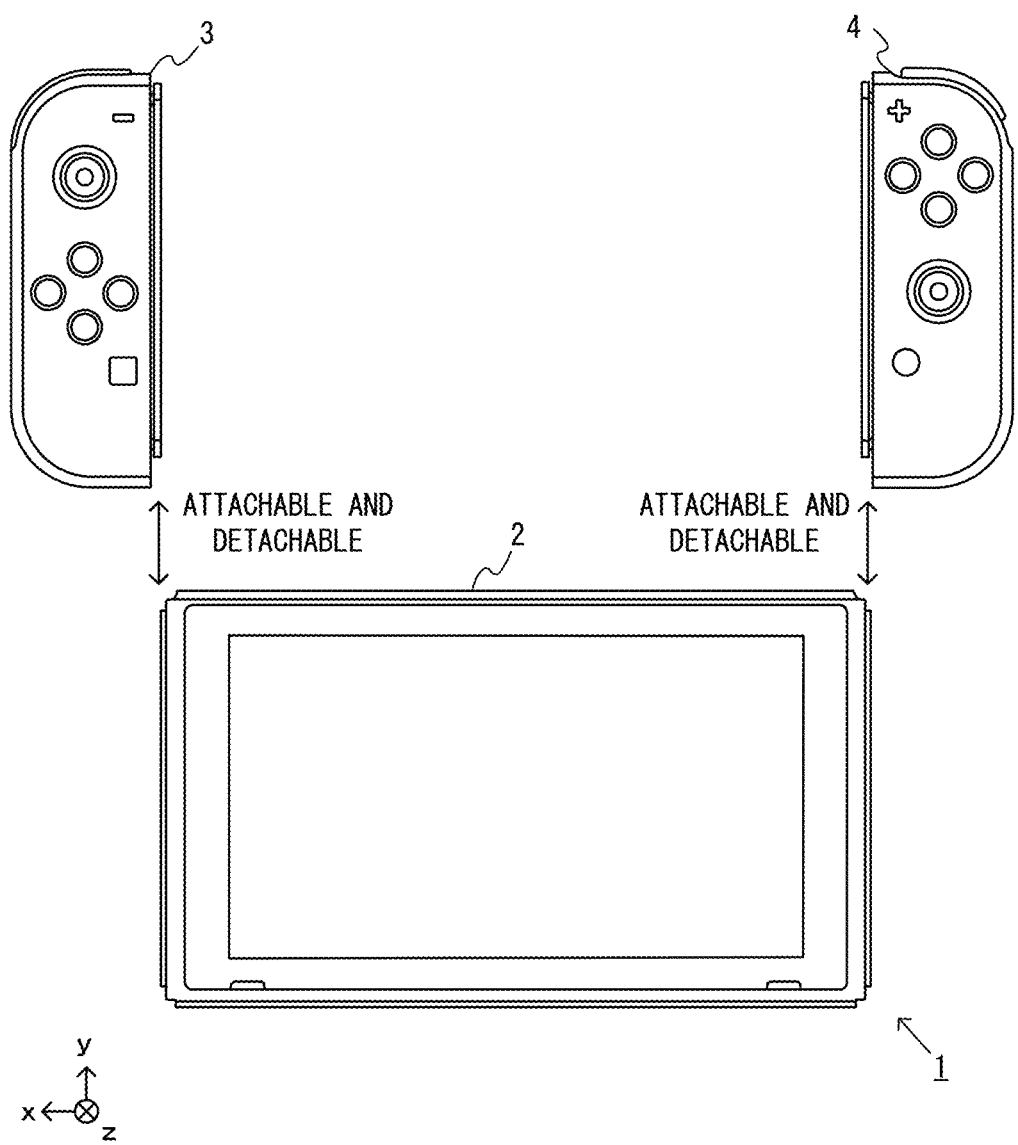
FIG. 2 is a diagram showing an example of the state where the non-limiting first left controller and the non-limiting first right controller are detached from the non-limiting main body apparatus.

FIG. 2 is a diagram showing an example of the state where each of the first left controller 3 and the first right controller 4 is detached from the main body apparatus 2. As shown in FIGS. 1 and 2, the first left controller 3 and the first right controller 4 are attachable to and detachable from the main body apparatus 2.

Figure 3:
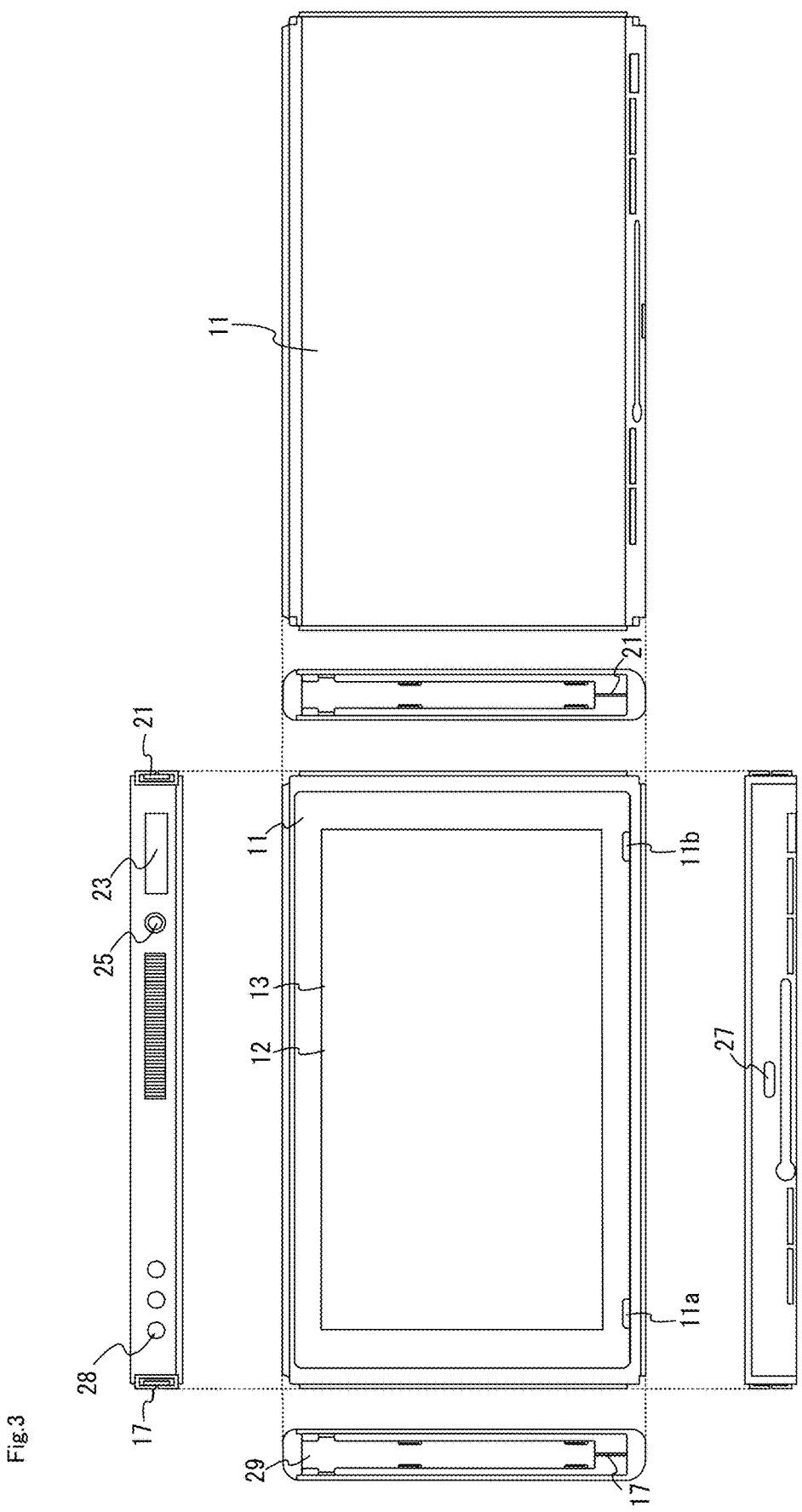
FIG. 3 is six orthogonal views showing an example of the non-limiting main body apparatus.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of a housing 11 has a generally rectangular shape.

It should be noted that the shape and the size of the housing 11 are optional. As an example, the housing 11 may be of a portable size. Further, the main body apparatus 2 alone or the unified apparatus obtained by attaching the first left controller 3 and the first right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the first left controller 3, and a right terminal 21, which is a terminal for the main body apparatus 2 to perform wired communication with the first right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
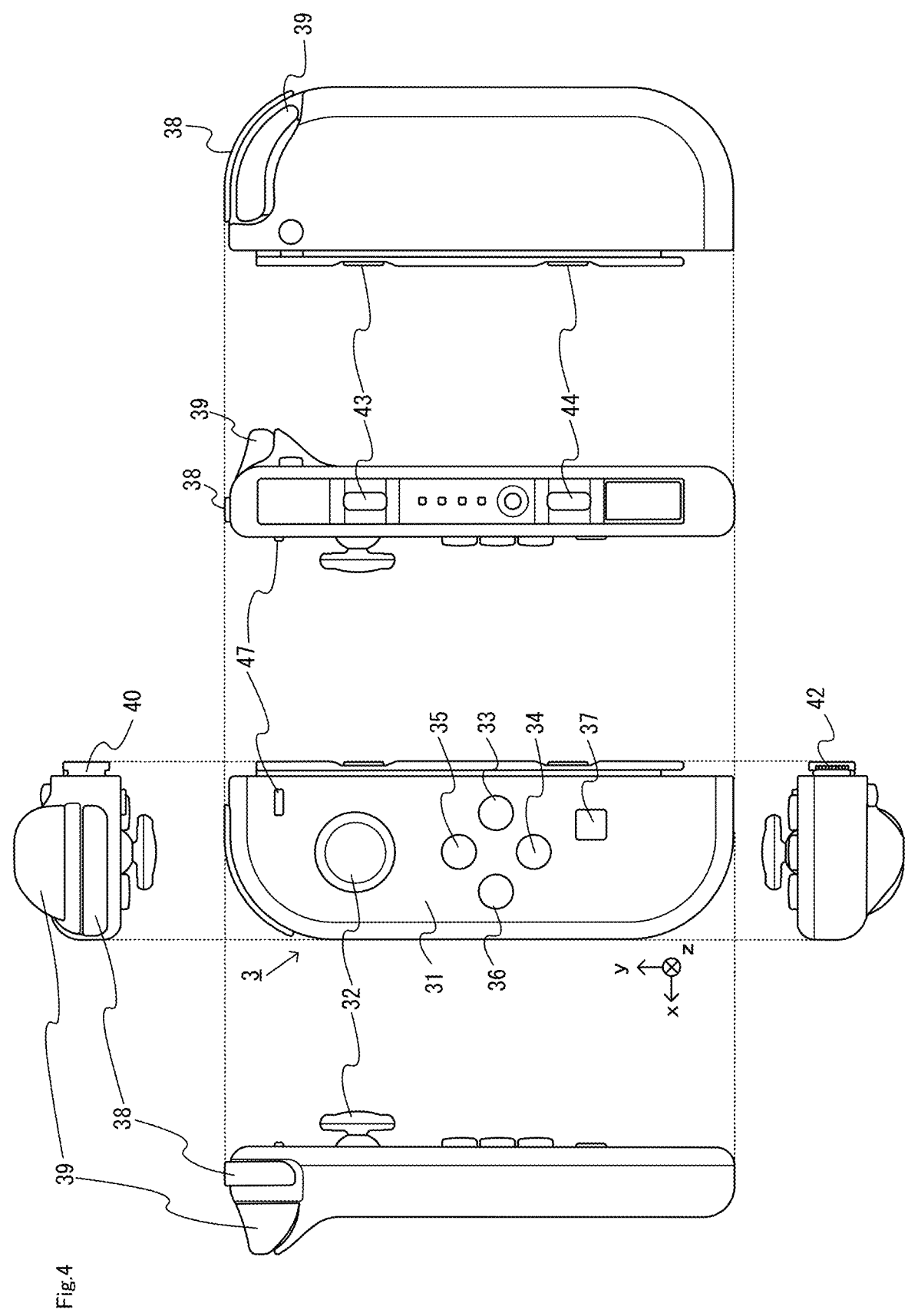
FIG. 4 is six orthogonal views showing an example of the non-limiting first left controller.

FIG. 4 is six orthogonal views showing an example of the first left controller 3. As shown in FIG. 4, the first left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the first left controller 3 is detached from the main body apparatus 2, the first left controller 3 can also be held in the orientation in which the first left controller 3 is vertically long. The housing 31 has such a shape and a size that when held in the orientation in which the housing 31 is vertically long, the housing 31 can be held with one hand, particularly the left hand. Further, the first left controller 3 can also be held in the orientation in which the first left controller 3 is horizontally long. When held in the orientation in which the first left controller 3 is horizontally long, the first left controller 3 may be held with both hands.

The first left controller 3 includes an analog stick 32. As shown in FIG. 4, an analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the first left controller 3 may include a directional pad, a slide stick that allows a slide input, or the like as the direction input section, instead of the analog stick. Further, in the exemplary embodiment, it is possible to provide an input by pressing the analog stick 32.

The first left controller 3 includes various operation buttons. The first left controller 3 includes four operation buttons 33 to 36 (specifically, a right direction button 33, a down direction button 34, an up direction button 35, and a left direction button 36) on the main surface of the housing 31. Further, the first left controller 3 includes a record button 37 and a "−" (minus) button 47. The first left controller 3 includes a first L-button 38 and a ZL-button 39 in an upper left portion of a side surface of the housing 31. Further, the first left controller 3 includes a second L-button 43 and a second R-button 44, on the side surface of the housing 31 on which the first left controller 3 is attached to the main body apparatus 2. These operation buttons are used to give instructions depending on various programs (e.g., an OS program and an application program) executed by the main body apparatus 2.

Further, the first left controller 3 includes a terminal 42 for the first left controller 3 to perform wired communication with the main body apparatus 2.

Figure 5:
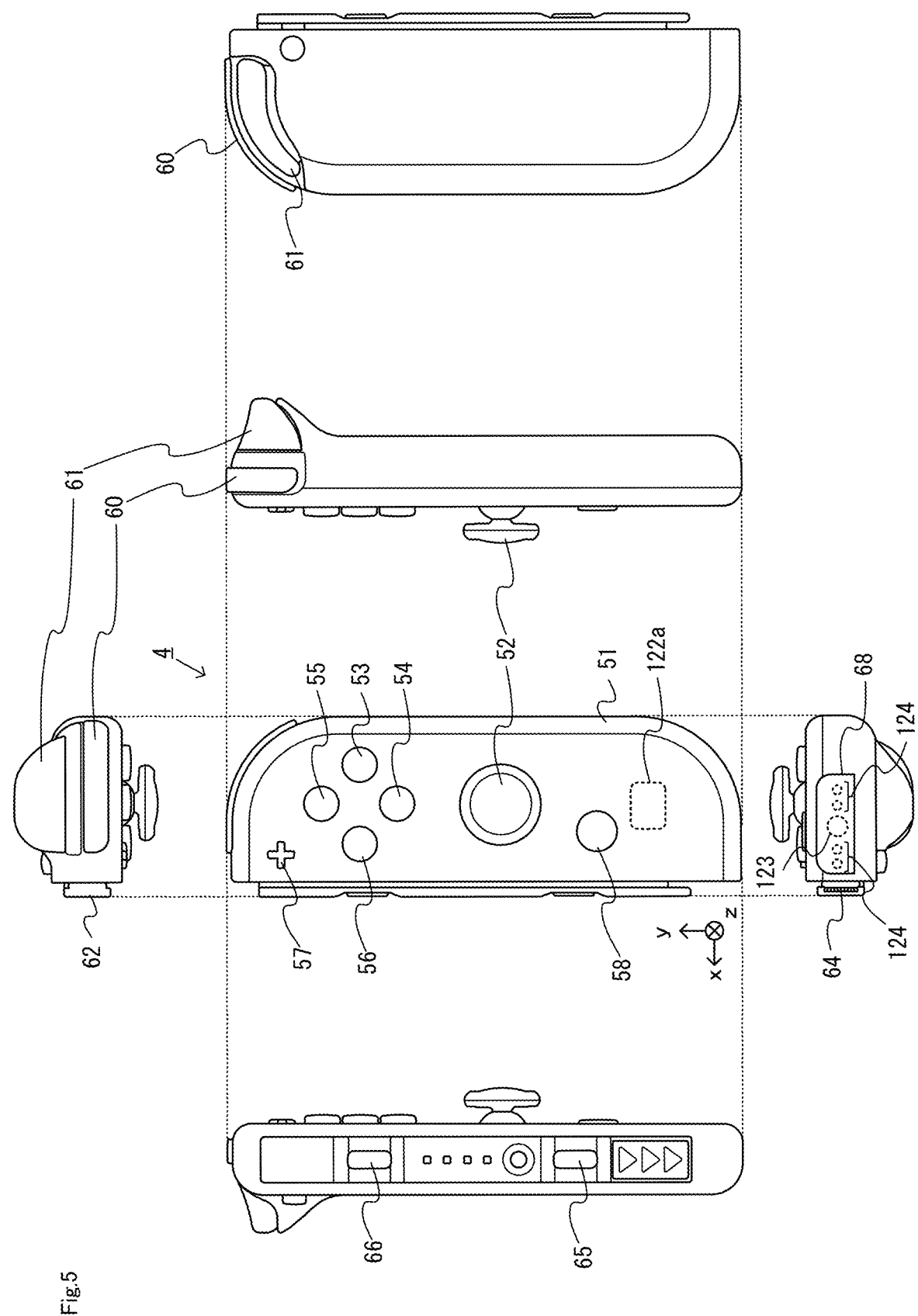
FIG. 5 is six orthogonal views showing an example of the non-limiting first right controller.

FIG. 5 is six orthogonal views showing an example of the first right controller 4. As shown in FIG. 5, the first right controller 4 includes a housing 51. In the exemplary embodiment, the housing 51 has a vertically long shape, i.e., is shaped to be long in the up-down direction. In the state where the first right controller 4 is detached from the main body apparatus 2, the first right controller 4 can also be held in the orientation in which the first right controller 4 is vertically long. The housing 51 has such a shape and a size that when held in the orientation in which the housing 51 is vertically long, the housing 51 can be held with one hand, particularly the right hand. Further, the first right controller 4 can also be held in the orientation in which the first right controller 4 is horizontally long. When held in the orientation in which the first right controller 4 is horizontally long, the first right controller 4 may be held with both hands.

Similarly to the first left controller 3, the first right controller 4 includes an analog stick 52 as a direction input section. In the exemplary embodiment, an analog stick 52 has the same configuration as that of the analog stick 32 of the first left controller 3. Further, the first right controller 4 may include a directional pad, a slide stick that allows a slide input, or the like, instead of the analog stick. Further, similarly to the first left controller 3, the first right controller 4 includes four operation buttons 53 to 56 (specifically, an A-button 53, a B-button 54, an X-button 55, and a Y-button 56) on a main surface of the housing 51. Further, the first right controller 4 includes a "+" (plus) button 57 and a home button 58. Further, the first right controller 4 includes a first R-button 60 and a ZR-button 61 in an upper right portion of a side surface of the housing 51. Further, similarly to the first left controller 3, the first right controller 4 includes a second L-button 65 and a second R-button 66.

Further, a window portion 68 is provided on a lower side surface of the housing 51. Although the details will be described later, the first right controller 4 includes an infrared image capturing section 123 and an infrared light-emitting section 124, which are placed within the housing 51. The infrared image capturing section 123 captures a portion around the first right controller 4 through a window portion 68 such that a down direction of the first right controller 4 (a negative y-axis direction shown in FIG. 5) is the image capturing direction. The infrared light-emitting section 124 emits infrared light through the window portion 68 to an image capturing target to be captured by the infrared image capturing section 123 such that a predetermined range about the down direction of the first right controller 4 (the negative y-axis direction shown in FIG. 5) is the emission range. The window portion 68 is used to protect a lens of a camera of the infrared image capturing section 123, a light emitter of the infrared light-emitting section 124, and the like and composed of a material (e.g., a transparent material) that transmits light of a wavelength sensed by the camera and light emitted from the light emitter. It should be noted that the window portion 68 may be a hole formed in the housing 51. It should be noted that in the exemplary embodiment, the infrared image capturing section 123 itself includes a filter member for inhibiting the transmission of light of a wavelength other than light sensed by the camera (infrared light in the exemplary embodiment). In another exemplary embodiment, the window portion 68 may have the function of a filter.

Further, although the details will be described later, the first right controller 4 includes an NFC communication section 122. The NFC communication section 122 performs short-range wireless communication based on the NFC (Near Field Communication) standard. The NFC communication section 122 includes an antenna 122a, which is used for short-range wireless communication, and a circuit (e.g., an NFC chip) for generating a signal (a radio wave) to be sent from the antenna 122a. It should be noted that the NFC communication section 122 may perform short-range wireless communication through any proximity communication (or contactless communication), instead of performing short-range wireless communication based on the NFC standard. Here, the NFC standard can be used for proximity communication (contactless communication), and "may perform short-range wireless communication through any proximity communication (or contactless communication)" is intended to mean that short-range wireless communication may be performed through other proximity communication except for proximity communication based on the NFC standard.

Further, the first right controller 4 includes a terminal 64 for the first right controller 4 to perform wired communication with the main body apparatus 2.

Figure 6:
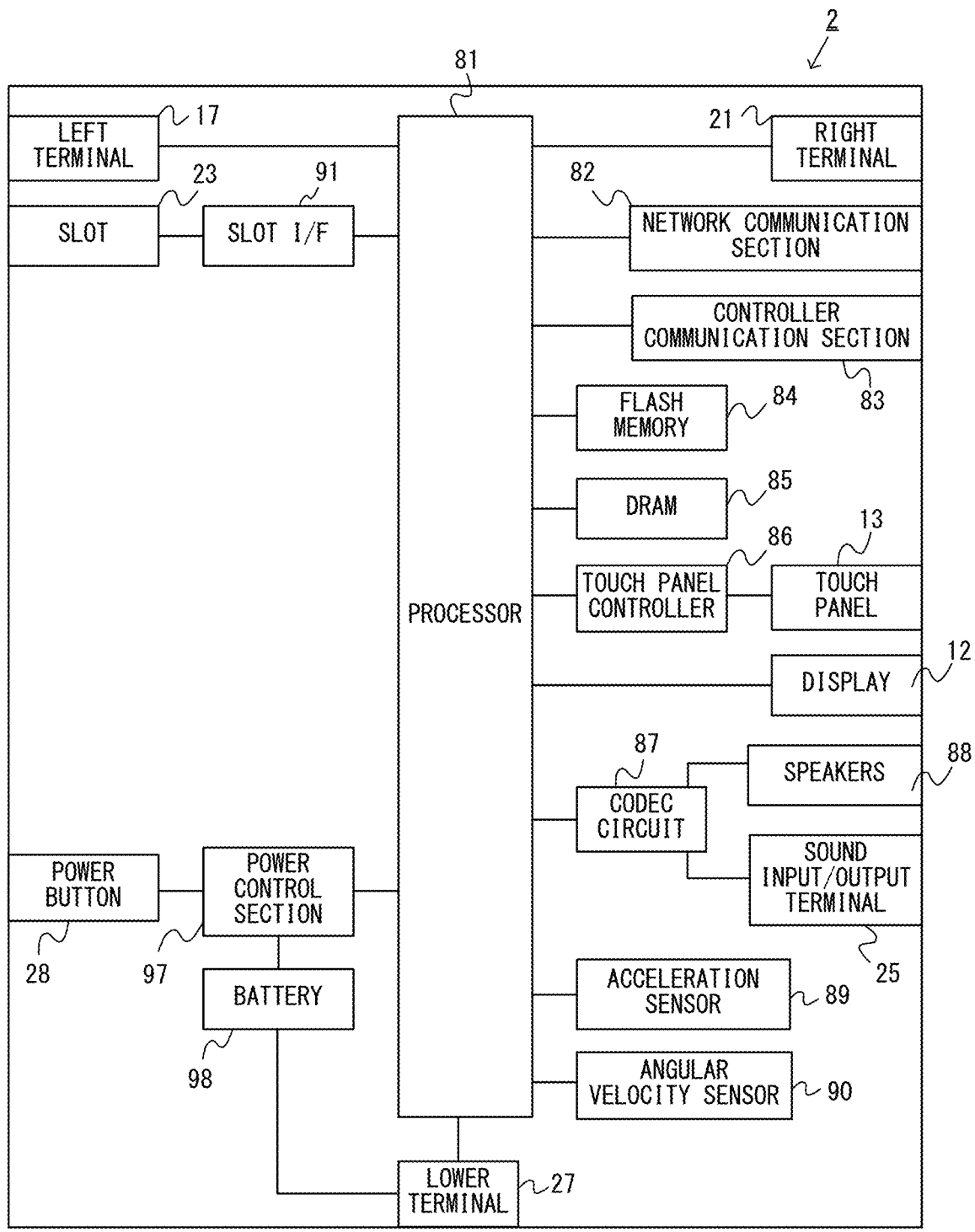
FIG. 6 is a block diagram showing an example of the internal configuration of the non-limiting main body apparatus.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the first left controller 3 and/or the first right controller 4. The communication method between the main body apparatus 2 and the first left controller 3 and the first right controller 4 is optional. In the exemplary embodiment, the controller communication section 83 performs communication compliant with the Bluetooth (registered trademark) standard with the first left controller 3 and with the first right controller 4.

The processor 81 is connected to the left terminal 17, the right terminal 21, and the lower terminal 27. When performing wired communication with the first left controller 3, the processor 81 transmits data to the first left controller 3 via the left terminal 17 and also receives operation data from the first left controller 3 via the left terminal 17. Further, when performing wired communication with the first right controller 4, the processor 81 transmits data to the first right controller 4 via the right terminal 21 and also receives operation data from the first right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the first left controller 3 and the first right controller 4. Further, when the unified apparatus obtained by attaching the first left controller 3 and the first right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of first left controllers 3 simultaneously (in other words, in parallel). Further, the main body apparatus 2 can communicate with a plurality of first right controllers 4 simultaneously (in other words, in parallel). Thus, a plurality of users can simultaneously provide inputs to the main body apparatus 2, each using a set of the first left controller 3 and the first right controller 4. As an example, a first user can provide an input to the main body apparatus 2 using a first set of the first left controller 3 and the first right controller 4, and simultaneously, a second user can provide an input to the main body apparatus 2 using a second set of the first left controller 3 and the first right controller 4.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

Further, the main body apparatus 2 includes an acceleration sensor 89. In the exemplary embodiment, the acceleration sensor 89 detects the magnitudes of accelerations along predetermined three axial (e.g., xyz axes shown in FIG. 1) directions. It should be noted that the acceleration sensor 89 may detect an acceleration along one axial direction or accelerations along two axial directions.

Further, the main body apparatus 2 includes an angular velocity sensor 90. In the exemplary embodiment, the angular velocity sensor 90 detects angular velocities about predetermined three axes (e.g., the xyz axes shown in FIG. 1). It should be noted that the angular velocity sensor 90 may detect an angular velocity about one axis or angular velocities about two axes.

The acceleration sensor 89 and the angular velocity sensor 90 are connected to the processor 81, and the detection results of the acceleration sensor 89 and the angular velocity sensor 90 are output to the processor 81. Based on the detection results of the acceleration sensor 89 and the angular velocity sensor 90, the processor 81 can calculate information regarding the motion and/or the orientation of the main body apparatus 2.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
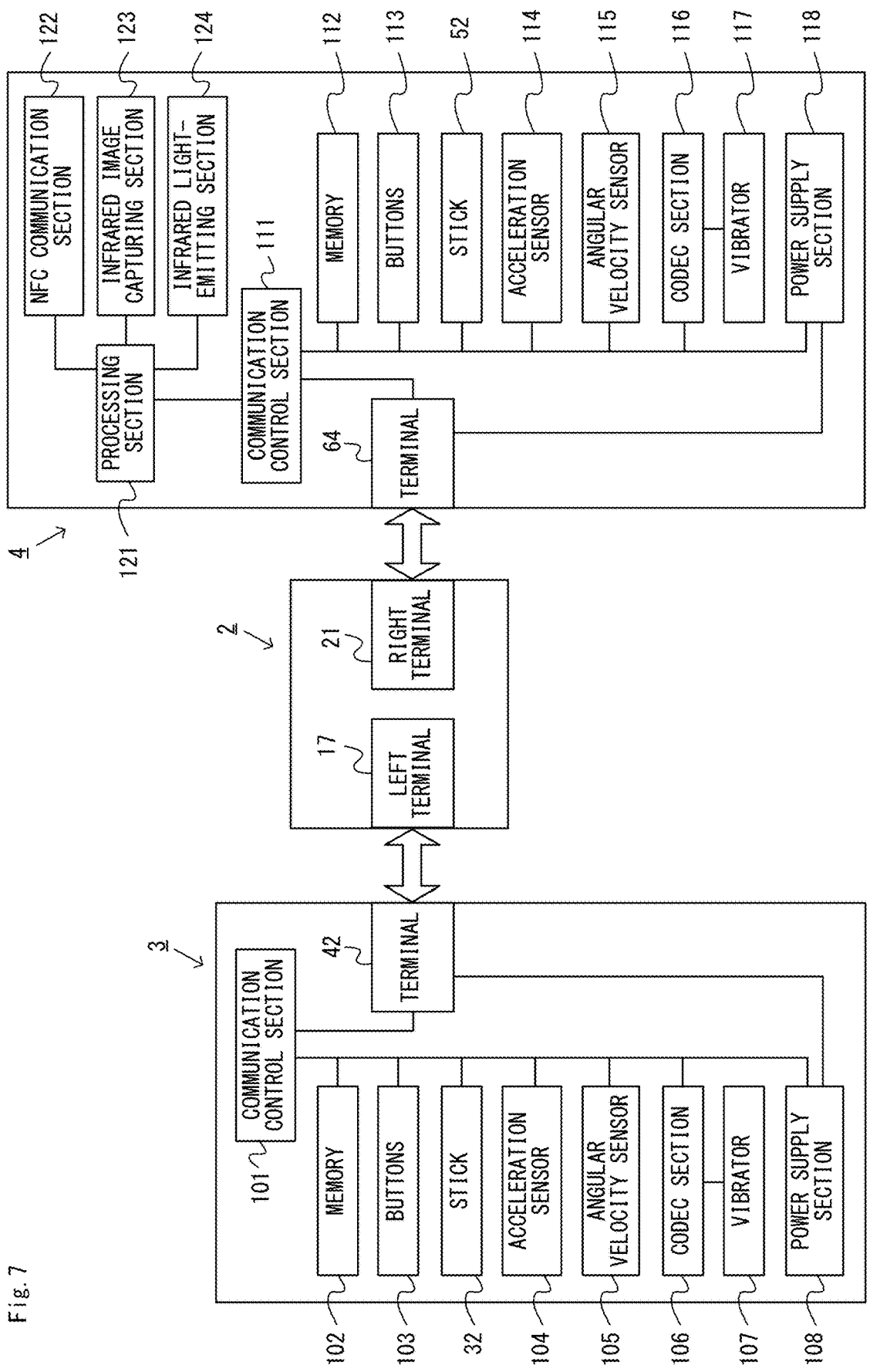
FIG. 7 is a block diagram showing examples of the internal configurations of the non-limiting main body apparatus, the non-limiting first left controller, and the non-limiting first right controller.

FIG. 7 is a block diagram showing examples of the internal configurations of the main body apparatus 2, the first left controller 3, and the first right controller 4. It should be noted that the details of the internal configuration of the main body apparatus 2 are shown in FIG. 6 and therefore are omitted in FIG. 7.

The first left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the first left controller 3 with the main body apparatus 2. That is, when the first left controller 3 is attached to the main body apparatus 2, the communication control section 101 communicates with the main body apparatus 2 via the terminal 42. Further, when the first left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the first left controller 3 includes a memory 102 such as a flash memory. The communication control section 101 includes, for example, a microcomputer (or a microprocessor) and executes firmware stored in the memory 102, thereby performing various processes.

The first left controller 3 includes buttons 103 (specifically, the buttons 33 to 39, 43, 44, and 47). Further, the first left controller 3 includes the analog stick ("stick" in FIG. 7) 32. Each of the buttons 103 and the analog stick 32 outputs information regarding an operation performed on itself to the communication control section 101 repeatedly at appropriate timing.

The first left controller 3 includes inertial sensors. Specifically, the first left controller 3 includes an acceleration sensor 104. Further, the first left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the first left controller 3. That is, the main body apparatus 2 can determine operations on the buttons 103 and the analog stick 32 based on the operation data. Further, the main body apparatus 2 can calculate information regarding the motion and/or the orientation of the first left controller 3 based on the operation data (specifically, the detection results of the acceleration sensor 104 and the angular velocity sensor 105).

The first left controller 3 includes a vibrator 107 for giving notification to the user by a vibration. In the exemplary embodiment, the vibrator 107 is controlled by a command from the main body apparatus 2. That is, if receiving the above command from the main body apparatus 2, the communication control section 101 drives the vibrator 107 in accordance with the received command. Here, the first left controller 3 includes a codec section 106. If receiving the above command, the communication control section 101 outputs a control signal corresponding to the command to the codec section 106. The codec section 106 generates a driving signal for driving the vibrator 107 from the control signal from the communication control section 101 and outputs the driving signal to the vibrator 107. Consequently, the vibrator 107 operates.

More specifically, the vibrator 107 is a linear vibration motor. Unlike a regular motor that rotationally moves, the linear vibration motor is driven in a predetermined direction in accordance with an input voltage and therefore can be vibrated at an amplitude and a frequency corresponding to the waveform of the input voltage. In the exemplary embodiment, a vibration control signal transmitted from the main body apparatus 2 to the first left controller 3 may be a digital signal representing the frequency and the amplitude every unit of time. In another exemplary embodiment, the main body apparatus 2 may transmit information indicating the waveform itself. The transmission of only the amplitude and the frequency, however, enables a reduction in the amount of communication data. Additionally, to further reduce the amount of data, only the differences between the numerical values of the amplitude and the frequency at that time and the previous values may be transmitted, instead of the numerical values. In this case, the codec section 106 converts a digital signal indicating the values of the amplitude and the frequency acquired from the communication control section 101 into the waveform of an analog voltage and inputs a voltage in accordance with the resulting waveform, thereby driving the vibrator 107. Thus, the main body apparatus 2 changes the amplitude and the frequency to be transmitted every unit of time and thereby can control the amplitude and the frequency at which the vibrator 107 is to be vibrated at that time. It should be noted that not only a single amplitude and a single frequency, but also two or more amplitudes and two or more frequencies may be transmitted from the main body apparatus 2 to the first left controller 3. In this case, the codec section 106 combines waveforms indicated by the plurality of received amplitudes and frequencies and thereby can generate the waveform of a voltage for controlling the vibrator 107.

The first left controller 3 includes a power supply section 108. In the exemplary embodiment, the power supply section 108 includes a battery and a power control circuit. Although not shown in FIG. 7, the power control circuit is connected to the battery and also connected to components of the first left controller 3 (specifically, components that receive power supplied from the battery).

As shown in FIG. 7, the first right controller 4 includes a communication control section 111, which communicates with the main body apparatus 2. Further, the first right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the first left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the first right controller 4 with the main body apparatus 2.

The first right controller 4 includes input sections similar to the input sections of the first left controller 3. Specifically, the first right controller 4 includes buttons 113, the analog stick 52, and inertial sensors (an acceleration sensor 114 and an angular velocity sensor 115). These input sections have functions similar to those of the input sections of the first left controller 3 and operate similarly to the input sections of the first left controller 3.

Further, the first right controller 4 includes a vibrator 117 and a codec section 116. The vibrator 117 and the codec section 116 operate similarly to the vibrator 107 and the codec section 106, respectively, of the first left controller 3. That is, in accordance with a command from the main body apparatus 2, the communication control section 111 causes the vibrator 117 to operate, using the codec section 116.

The first right controller 4 includes the NFC communication section 122, which performs short-range wireless communication based on the NFC standard. The NFC communication section 122 has the function of a so-called NFC reader/writer. Here, the term "short-range wireless communication" as used herein includes a communication method where a radio wave from an apparatus (here, the first right controller 4) develops an electromotive force (e.g., by electromagnetic induction) in another device (here, a device near the antenna 122a). The other device can operate by the developed electromotive force, and may or may not have a power supply. When the first right controller 4 (the antenna 122a) and a communication target come close to each other (typically, the distance between the first right controller 4 and the communication target becomes dozen centimeters or less), the NFC communication section 122 becomes able to communicate with the communication target. The communication target is any apparatus capable of performing short-range wireless communication with the NFC communication section 122 and is, for example, an NFC tag or a storage medium having the function of an NFC tag. Alternatively, the communication target may be another apparatus having an NFC card emulation function.

Further, the first right controller 4 includes the infrared image capturing section 123. The infrared image capturing section 123 includes an infrared camera for capturing a portion around the first right controller 4. As an example, the main body apparatus 2 and/or the first right controller 4 calculate information of a captured image (e.g., information related to the luminance of a plurality of blocks into which at least the entirety of a partial area of a captured image is divided or the like), and based on the calculated information, determine a change in the portion around the first right controller 4. Further, the infrared image capturing section 123 may capture an image using ambient light, but in the exemplary embodiment, includes the infrared light-emitting section 124, which emits infrared light. The infrared light-emitting section 124 emits infrared light, for example, in synchronization with the timing when the infrared camera captures an image. Then, the infrared light emitted from the infrared light-emitting section 124 is reflected by an image capturing target, and the infrared camera receives the reflected infrared light, thereby acquiring an image of the infrared light. This enables the infrared image capturing section 123 to obtain a clearer infrared light image. It should be noted that the infrared image capturing section 123 and the infrared light-emitting section 124 may be provided as different devices in the first right controller 4, or may be provided as a single device in the same package in the first right controller 4. Further, in the exemplary embodiment, the infrared image capturing section 123 including an infrared camera is used. In another exemplary embodiment, a visible light camera (a camera using a visible light image sensor) may be used as image capturing means, instead of the infrared camera.

The first right controller 4 includes a processing section 121. The processing section 121 is connected to the communication control section 111. Further, the processing section 121 is connected to the NFC communication section 122, the infrared image capturing section 123, and the infrared light-emitting section 124. In accordance with a command from the main body apparatus 2, the processing section 121 performs the process of managing the NFC communication section 122. For example, in accordance with a command from the main body apparatus 2, the processing section 121 controls the operation of the NFC communication section 122. Further, the processing section 121 controls the start of the NFC communication section 122 or controls the operations (specifically, reading, writing, and the like) of the NFC communication section 122 performed on a communication target (e.g., an NFC tag). Further, the processing section 121 receives, from the main body apparatus 2, information to be transmitted to the communication target via the communication control section 111 and passes the information to the NFC communication section 122. Further, the processing section 121 acquires, from the NFC communication section 122, information received from the communication target and transmits the information to the main body apparatus 2 via the communication control section 111.

Further, the processing section 121 includes a CPU, a memory, and the like. Based on a predetermined program (e.g., an application program for performing image processing and various calculations) stored in a storage device (e.g., a non-volatile memory or the like) (not shown) included in the first right controller 4, and in accordance with a command from the main body apparatus 2, the processing section 121 performs the process of managing the infrared image capturing section 123. For example, the processing section 121 causes the infrared image capturing section 123 to perform an image capturing operation. Further, the processing section 121 acquires and/or calculates information based on an image capturing result (information of a captured image, information calculated from this information, or the like) and transmits the information to the main body apparatus 2 via the communication control section 111. Further, in accordance with a command from the main body apparatus 2, the processing section 121 performs the process of managing the infrared light-emitting section 124. For example, in accordance with a command from the main body apparatus 2, the processing section 121 controls the light emission of the infrared light-emitting section 124. It should be noted that a memory used by the processing section 121 to perform processing may be provided in the processing section 121 or may be the memory 112.

The first right controller 4 includes a power supply section 118. The power supply section 118 has a function similar to that of the power supply section 108 of the first left controller 3 and operates similarly to the power supply section 108.

(Slide Member of Main Body Apparatus)

The configuration that enables a controller to be attached to and detached from the main body apparatus 2 will now be described. In the present embodiment, a slide mechanism allows the controller to be detachably attached to the main body apparatus 2. The main body apparatus 2 and the controller each include a slide member that forms a slide mechanism. The slide member of the main body apparatus 2 and the slide member of the controller can be slidably attached to each other. The slide member of the main body apparatus 2 will now be described.

As shown in FIG. 3, the main body apparatus 2 includes a main body rail member 29 as an example of the slide member. The main body rail member 29 is provided on the left side surface of the main body apparatus 2. The main body rail member 29 is a slide member that allows the first left controller 3 (or the second left controller 6 to be described later) to be detachably attached to the main body apparatus 2. Note that in other embodiments, the main body rail member 29 may be formed as an integral unit with the housing 11 of the main body apparatus 2. That is, a part of the housing 11 may function as the main body rail member.

Figure 8:
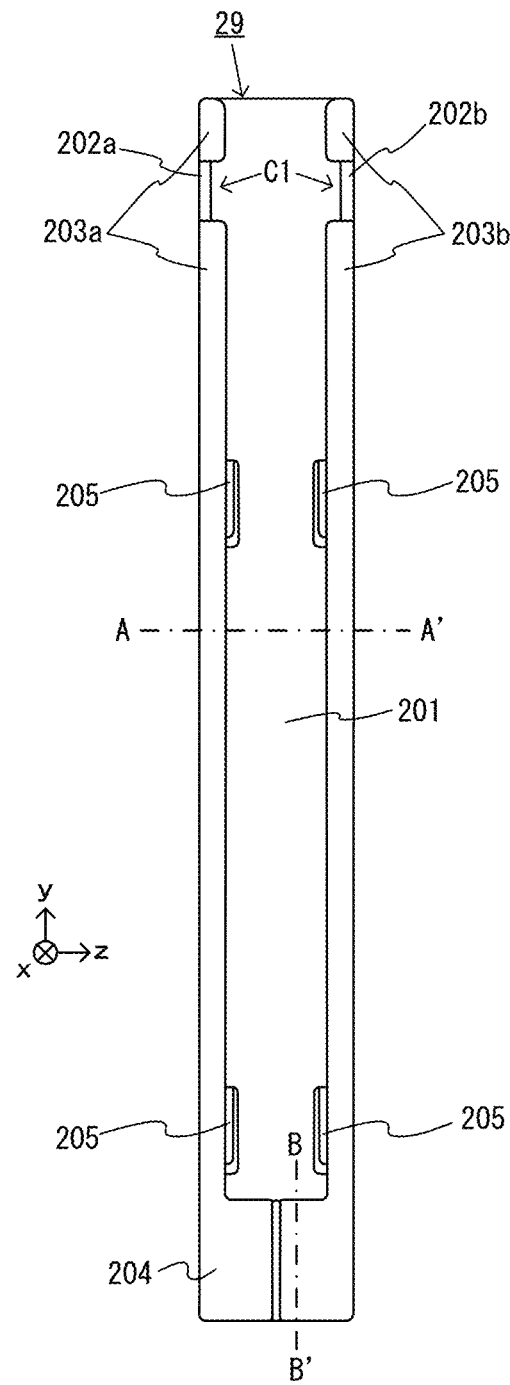
FIG. 8 is an enlarged view of a main body rail member shown in FIG. 3.
Figure 9:
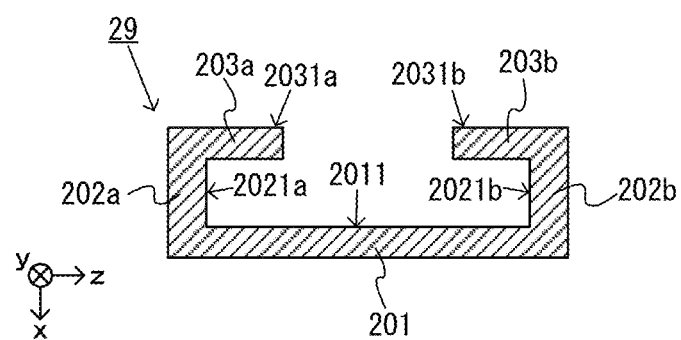
FIG. 9 is a diagram schematically showing an example of a cross section of the main body rail member taken along A-A' shown in FIG. 8.

FIG. 8 is an enlarged view of the main body rail member 29 shown in FIG. 3. FIG. 9 is a diagram schematically showing an example of a cross section of the main body rail member 29 taken along A-A' shown in FIG. 8. Note that "to schematically show" as used herein means to show an element of interest (e.g., the main body rail member 29 in FIG. 9) in such a manner that its size, shape and/or positional relationship with other elements may be different from other figures so that the element of interest is more conspicuous.

As shown in FIG. 8 and FIG. 9, the main body rail member 29 includes a bottom surface portion 201, side surface portions 202*a* and 202*b*, and top surface portions 203*a* and 203*b*. Note that the side surface portions 202*a* and 202*b* may be hereinafter referred to collectively as "a side surface portion 202". Also, the top surface portions 203*a* and 203*b* may be referred to collectively as "a top surface portion 203". In the present embodiment, these portions 201 to 203 are generally plate-shaped members.

The bottom surface portion 201 is placed on the engaging surface (i.e., the left side surface) of the housing 11 so as to be substantially parallel to the engaging surface. Note that "substantially (in a certain state)" as used herein means to include cases in which that state is achieved in a strict sense and also cases in which that state is generally achieved. For example, "substantially parallel" means that they may be parallel to each other in a strict sense, and they may not be parallel to each other in a strict sense but may be generally parallel to each other.

The bottom surface portion 201 includes a bottom surface 2011 of the main body rail member 29. As shown in FIG. 9, the side surface portion 202 includes side surfaces 2021 (specifically, side surfaces 2021*a* and 2021*b*) substantially perpendicular to the bottom surface. The side surface portions 202 extend substantially perpendicular to the bottom surface portion 201 from the opposite ends of the bottom surface portion 201 in the width direction (i.e., the z-axis direction shown in FIG. 8). Specifically, the side surface portion 202*a* extends from one end (i.e., the z-axis negative direction side) of the bottom surface portion 201, and the side surface portion 202*b* extends from the other end (i.e., the z-axis positive direction side) of the bottom surface portion 201. As shown in FIG. 9, the bottom surface portion 201 and the side surface portion 202 together form a groove portion. Note that the upper end (i.e., the end on the y-axis positive direction side) of the groove portion has an opening so that the slide member of the controller can be inserted through the upper end.

As shown in FIG. 9, the top surface portion 203 includes a top surface 2031 (specifically, top surfaces 2031*a* and 2031*b*) substantially parallel to the bottom surface 2011. The top surface portion 203 extends in a direction substantially parallel to the bottom surface 2011 from an end of the side surface portion 202 that is opposite to the end at which the bottom surface portion 201 is connected to the side surface portion 202 (i.e., the x-axis negative direction side). Specifically, the top surface portion 203*a* extends from an end portion of the side surface portion 202*a* on the x-axis negative direction side, and the top surface portion 203*b* extends from an end portion of the side surface portion 202*b* on the x-axis negative direction side. The top surface portions 203*a* and 203*b* are provided so as to protrude from the side surface portion 202 toward the inside of the main body rail member 29 (in other words, so as to protrude toward each other). The top surface portion 203*a* and the top surface portion 203*b* are spaced apart from each other so that the slide member of the controller can be inserted into the groove portion formed by the bottom surface portion 201 and the side surface portion 202 (FIG. 9).

A part of the upper end portion (i.e., the end portion on the y-axis positive direction side) of the top surface portion 203 includes a cut-out portion C1, as shown in FIG. 8. Although the details will be described later, the cut-out portion C1 is provided so that a stop member of the controller engages with the cut-out portion C1 (strictly speaking, the top surface portion 203 around the cut-out portion C1) in a state in which the controller is attached to the main body apparatus 2. That is, a portion of the top surface portion 203 where the cut-out portion C1 is formed serves as a stop-receiving portion that receives the stop member of the controller.

Figure 10:
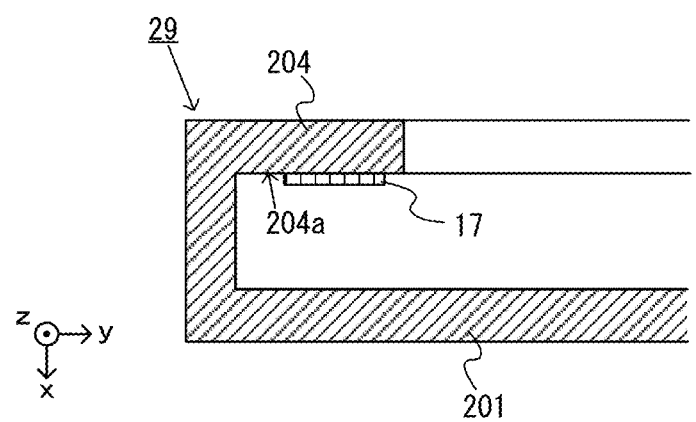
FIG. 10 is a diagram schematically showing an example of a cross section in the vicinity of the lower end of the rail member shown in FIG. 8.

FIG. 10 is a diagram schematically showing an example of a cross section in the vicinity of the lower end of the rail member shown in FIG. 8. FIG. 10 is a diagram schematically showing an example of a partial cross section of the main body rail member 29 taken along B-B' shown in FIG. 8.

As shown in FIG. 8 and FIG. 10, the main body rail member 29 includes an opposing portion 204. In the present embodiment, the opposing portion 204 stops the slide movement of the slide member by being in contact with the slide member of the controller, which is inserted into the main body rail member 29 from the upper side in the slide direction. Note that in other embodiments, the slide movement of the slide member may be stopped by the distal end of the slide member being in contact with a wall surface provided on the far end (i.e., the y-axis negative direction side shown in FIG. 10) of the opposing portion 204 instead of (or in addition to) the opposing portion 204 being in contact with the slide member of the controller.

As shown in FIG. 10, the opposing portion 204 is provided, spaced apart from the bottom surface portion 201, so as to be located to oppose a portion of the bottom surface portion 201 (specifically, a portion near the lower end of the bottom surface portion 201). The opposing portion 204 includes an opposing surface 204a facing toward the bottom surface portion 201. The opposing surface 204a is a surface that is facing toward the housing 11 of the main body apparatus 2 (in other words, the engaging surface). In the present embodiment, when the controller is attached to the main body apparatus 2, the slide member of the controller (more specifically, a protruding portion 308 to be described later) is inserted into the space between the bottom surface portion 201 and the opposing portion 204.

In the present embodiment, the top surface portion 203 and the opposing portion 204 are formed as an integral unit. In other words, the upper surface of the opposing portion 204 (i.e., the surface facing toward the x-axis negative direction side) is continuous with the upper surface of the top surface portion 203 (i.e., the surface facing toward the x-axis negative direction side). This makes it possible to simplify the shape of the main body rail member 29, and to facilitate the production of the rail member.

Note that in the present embodiment, the main body rail member 29 including the portions 201 to 204 is a metal. This makes it possible to improve the mechanical strength of the rail member. Moreover, by improving the mechanical strength of the rail member, it is also possible to contribute to improving the mechanical strength of the main body apparatus 2 to which the rail member is attached.

As shown in FIG. 8, the main body rail member 29 includes a leaf spring 205. The leaf spring 205 is provided on the bottom surface portion 201 of the main body rail member 29. The leaf spring 205 is an example of an elastic member for applying a force in a direction away from the main body apparatus 2 (i.e., the x-axis negative direction shown in FIG. 9) onto the controller in a state in which the controller is attached to the main body apparatus 2. In other embodiments, an elastic member of a rubber, or the like, may be used instead of the leaf spring. In other embodiments, the main body rail member 29 does not need to include the leaf spring 205.

As shown in FIG. 10, left-side terminals 17 of the main body apparatus 2 are provided on the opposing surface 204a of the opposing portion 204. As shown in FIG. 10, the left-side terminals 17 are arranged so that one side thereof facing the bottom surface portion 201 is exposed. Thus, in the present embodiment, the left-side terminals 17 are arranged on the reverse side (i.e., the side opposing the bottom surface portion 201) of the member (i.e., the opposing portion 204) arranged spaced apart from the engaging surface of the main body apparatus 2 (i.e., the bottom surface portion 201). Then, it is possible to reduce the possibility that the left-side terminals 17 come into contact with a hand of the user or other objects, thereby protecting the left-side terminals 17.

The main body apparatus 2 includes a rail member similar to the main body rail member 29 on the right side surface of the main body apparatus 2 (FIG. 3). The rail member provided on the right side surface is an example of a slide member that allows the first right controller 4 (or the second right controller 7 to be described later) to be detachably attached to the main body apparatus 2. The configuration of the rail member provided on the right side surface is similar to the configuration of the main body rail member 29, and will not be described below in detail. Similar to the left-side terminals 17, right-side terminals 21 are provided on the opposing surface of the opposing portion of the rail member.

[2. Configuration of Second Controller]

Next, an example of a configuration of the second controller included in the game system will be described. FIG. 11 is a diagram showing an example of the second left controller. FIG. 12 is a diagram showing an example of the second right controller. The second left controller 6 shown in FIG. 11 can be attached to the left side surface of the main body apparatus 2, as can the first left controller 3. The second right controller 7 shown in FIG. 12 can be attached to the right side surface of the main body apparatus 2, as can the first right controller 4. As shown in FIG. 11 and FIG. 12, the second controller is different from the first controller in that a portion thereof has a bent shape. The configuration of the second controller will now be described using the second left controller 6 as an example. Note that the internal configuration of the second controller is similar to the internal configuration of the first controller (FIG. 7) and will not be described below in detail.

[2-1. Second Left Controller]

[2-1-1. Body Section]

Figure 13:
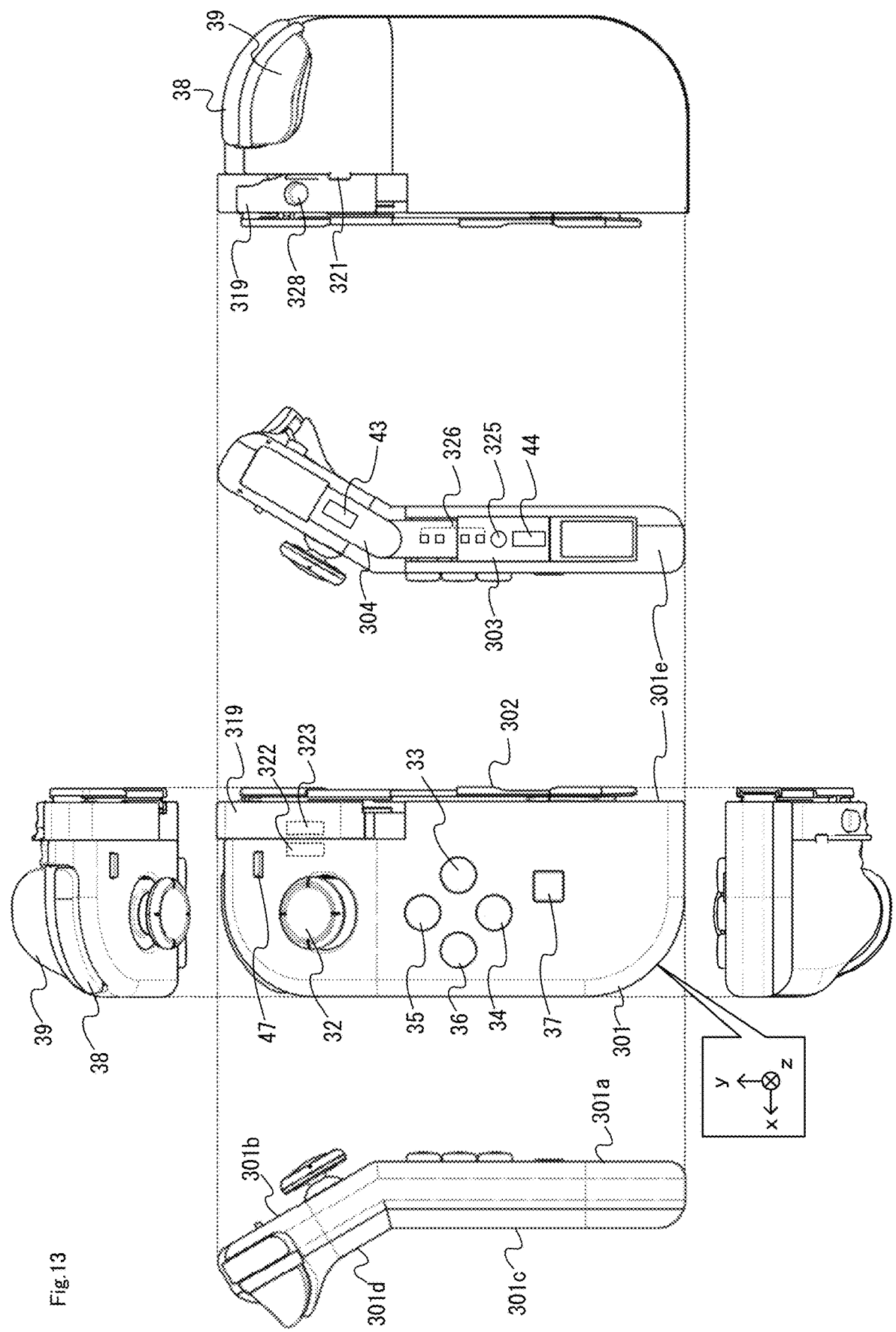
FIG. 13 is six orthogonal views showing an example of the non-limiting second left controller shown in FIG. 11.

FIG. 13 is six orthogonal views showing an example of the second left controller 6 shown in FIG. 11. As shown in FIG. 11 and FIG. 13, the second left controller 6 includes a body section 301. The body section 301 is a portion that is primarily held by the user when the user uses the second left controller 6. The body section 301 is provided with operation sections (e.g., the analog stick 32, etc.). Herein, with the body section 301 of the second left controller 6, as opposed to the first left controller 3, an upper portion (i.e., the y-axis positive direction side shown in FIG. 11) of the plate-shaped body (in other words, a rectangular parallelepiped) is bent rearward (i.e., the z-axis positive direction shown in FIG. 11). Although the details will be described later, as the body section 301 is bent, the second left controller 6 has such a shape that the second left controller 6 can be easily held and operated by the user.

As shown in FIG. 11 and FIG. 13, the front surface of the body section 301 is bent in an upwardly-protruding shape. Specifically, the front surface of the body section 301 includes a non-inclined surface 301a and an inclined surface 301b. In the present embodiment, the non-inclined surface 301a and the inclined surface 301b are each a plane (specifically, a plane such that a straight line between any two points on the plane is always included in the plane). Note however that in other embodiments, the non-inclined surface 301a and/or the inclined surface 301b may be a curved surface (e.g., an upwardly-protruding curved surface). In other embodiments, the connecting portion between the non-inclined surface 301a and the inclined surface 301b (in other words, the boundary between the non-inclined surface 301a and the inclined surface 301b) may be chamfered.

The non-inclined surface 301a is a surface that is substantially perpendicular to the front surface direction of the second left controller 6 (referred to also as the front-rear direction, that is, the z-axis direction shown in FIG. 11). In the present embodiment, the non-inclined surface 301a is a lower portion (i.e., the y-axis negative direction side shown in FIG. 11) of the front surface of the body section 301.

The inclined surface 301b is provided on the upper side of the non-inclined surface 301a. The inclined surface 301b is a surface that is continuous with the non-inclined surface 301a, and is provided inclined with respect to the non-inclined surface 301a. The inclined surface 301b is inclined in a direction such that an upper portion of the inclined surface 301b is located rearward (i.e., the z-axis positive direction side) of a lower portion of the inclined surface 301b. It can be said that the inclined surface 301b is inclined in substantially the same direction as the pivoting direction of a pivoting portion 304 to be described later (i.e., the direction in which the pivoting portion 304 pivots about the x axis). The inclined surface 301b is provided inclined by a predetermined angle (e.g.,) 30° with respect to the non-inclined surface 301a. Note that the direction in which the inclined surface 301b is inclined with respect to the non-inclined surface 301a is substantially the same direction as the direction in which the pivoting portion 304 to be described later pivots. In other embodiments, there is no limitation on the magnitude of the inclination angle of the inclined surface 301b.

As shown in FIG. 13, the body section 301 has a plate shape. The reverse surface of the body section 301 is provided generally parallel to the front surface of the body section 301. Specifically, the reverse surface of the body section 301 includes a first reverse surface 301c that is substantially parallel to the non-inclined surface 301a, and a second reverse surface 301d that is substantially parallel to the inclined surface 301b.

The body section 301 has a side surface that is in contact with the front surface and the reverse surface. In the present embodiment, a slide member 302 is provided on the right side surface, of the side surfaces, of the body section 301. Note that as shown in FIG. 11, the right side surface of the body section 301 includes a first right side surface 301e and a second right side surface 301f. The first right side surface 301e is a side surface provided on a portion of the right side surface of the body section 301 that is on the side (specifically, the left-right direction, i.e., the x-axis direction shown in FIG. 11) of the non-inclined surface 301a. The second right side surface 301f is a side surface provided on a portion of the right side surface of the body section 301 that is on the side of the inclined surface 301b.

As shown in FIG. 11 and FIG. 13, in the present embodiment, the operation buttons 33 to 36 and the record button 37 are provided on the non-inclined surface 301a. The analog stick 32 and the "−" (minus) button 47 are provided on the inclined surface 301b. Note that in the present specification, components of the second left controller 6 that are also included in the first left controller 3 described above are denoted by the same reference signs as those of the first left controller 3.

As shown in the front view of FIG. 13, the upper left portion of the body section 301 (strictly speaking, the upper left portion as the body section 301 is seen from the front side) is chamfered in a rounded shape. The first L button 38 and the ZL button 39 are provided on the corner portion. The first L button 38 is provided on the upper left portion of the side surface of the body section 301. The ZL button 39 is provided on the upper left portion so as to extend from the side surface of the body section 301 to the reverse surface (more specifically, the second reverse surface 301d). That is, the ZL button 39 is provided on the rear side (the z-axis positive direction side shown in FIG. 13) of the first L button 38. In the present embodiment, since the upper left portion of the body section 301 has a rounded shape, the first L button 38 and the ZL button 39 have a rounded shape in accordance with the roundedness of the upper left portion of the body section 301.

[2-1-2. Slide Member]

As shown in FIG. 11 and FIG. 13, the second left controller 6 includes the slide member 302. In the present embodiment, the slide member 302 includes a fixed portion 303 and the pivoting portion 304. The fixed portion 303 is fixed to the body section 301. The pivoting portion 304 can pivot relative to the fixed portion 303. That is, a portion (i.e., the pivoting portion 304) of the slide member 302 of the second left controller 6 is movable relative to the body section 301. The slide member 302 can change its shape by pivoting the pivoting portion 304.

As shown in FIG. 11, the fixed portion 303 is provided on the first right side surface 301e. That is, the fixed portion 303 is provided on the side of the non-inclined surface 301a. The fixed portion 303 is provided protruding from the first right side surface 301e. The fixed portion 303 is a bar-shaped member and is provided along the up-down direction (i.e., the y-axis direction shown in FIG. 13) of the second left controller 6. Note that the fixed portion 303 is provided on the side of the body section 301 so as not to protrude from the front surface of the body section 301 as seen from the direction perpendicular to the side surface of the body section 301 (see FIG. 14 to be described below). That is, the fixed portion 303 is provided on the back surface side relative to the front surface of the body section 301. For example, the fixed portion 303 is provided so as to be within the extent of the first right side surface 301e as seen from the direction perpendicular to the side surface of the body section 301.

The fixed portion 303 has such a shape that it can slidably engage with the main body rail member 29. Note that the direction (the y-axis direction shown in FIG. 11 in the present embodiment) in which the fixed portion 303 can slide in a state where the fixed portion 303 engages with the main body rail member 29 of the main body apparatus 2 will hereinafter be referred to as the "slide direction (of the fixed portion 303)". The axis that passes through the fixed portion 303 (more specifically, the center of the fixed portion 303) and that is parallel to the slide direction of the fixed portion 303 is referred to as the "slide axis (of the fixed portion 303)". Therefore, the fixed portion 303 can slidably engage with the main body rail member 29 in the direction along the slide axis of the fixed portion 303. An example of a specific configuration of the fixed portion 303 will now be described.

Figure 14:
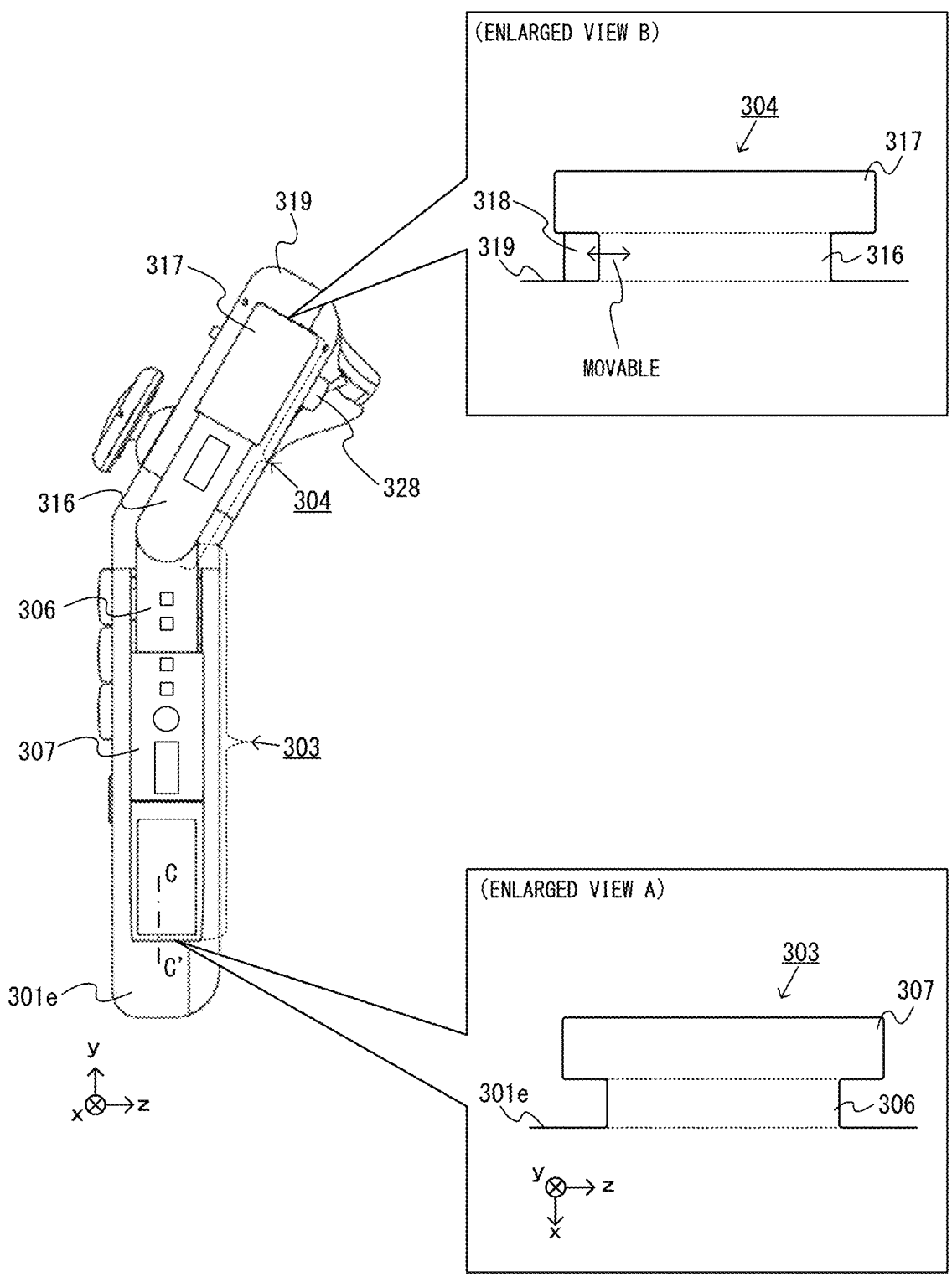
FIG. 14 is an enlarged view showing an example of a fixed portion and a pivoting portion of the non-limiting second left controller.

FIG. 14 is an enlarged view showing an example of the fixed portion 303 and the pivoting portion 304 of the second left controller 6. Enlarged view A shown in FIG. 14 is an enlarged view as the fixed portion 303 is seen from the lower side (i.e., the y-axis negative direction side shown in FIG. 14).

As shown in Enlarged view A, the fixed portion 303 is shaped so that a cross section thereof taken perpendicular to the slide direction is generally T-shaped. Specifically, the fixed portion 303 includes a shaft 306 and a top surface portion 307. As shown in Enlarged view A, the shaft 306 is provided so as to protrude from the first right side surface 301e of the body section 301. The top surface portion 307 is provided on one side of the shaft 306 that is away from the body section 301 (i.e., the x-axis negative direction side). The width of the top surface portion 307 (i.e., the length in the z-axis direction) is greater than the width of the shaft 306. The end of the top surface portion 307 in the z-axis direction is located so as to protrude past (in other words, located on the outer side of) the end of the shaft 306 in the z-axis direction.

Thus, the fixed portion 303 has a cross-sectional shape along a cross section perpendicular to the slide direction such that the width of a first portion (i.e., the shaft 306) that protrudes from the side surface (in other words, that is adjacent to the side surface) of the body section 301 is shorter than the width of a second portion (i.e., the top surface portion 307) that is located farther away from the side surface than the first portion. Although the details will be described later, with the shape described above, the fixed portion 303 in engagement with the main body rail member 29 of the main body apparatus 2 is locked on the main body rail member 29 so as not to come off in the direction perpendicular to the slide direction (see FIG. 21).

As shown in FIG. 14, the fixed portion 303 is a bar-shaped member extending along the slide axis. The shaft 306 and the top surface portion 307 are provided so as to extend along the slide axis of the fixed portion 303. In the present embodiment, the slide axis of the fixed portion 303 is provided to be substantially parallel to the non-inclined surface 301a. The slide axis of the fixed portion 303 is provided to be substantially parallel to the first right side surface 301e of the body section 301.

As shown in FIG. 11 and FIG. 14, the shaft 306 is provided and the top surface portion 307 is absent on an upper portion (i.e., a portion on the y-axis positive direction side) of the fixed portion 303. Thus, the top surface portion 307 does not need to be provided over the entirety in the slide direction of the fixed portion 303. In other embodiments, as with the top surface portion 307, the shaft 306 also does not need to be provided over the entirety in the slide direction of the fixed portion 303.

Figure 15:
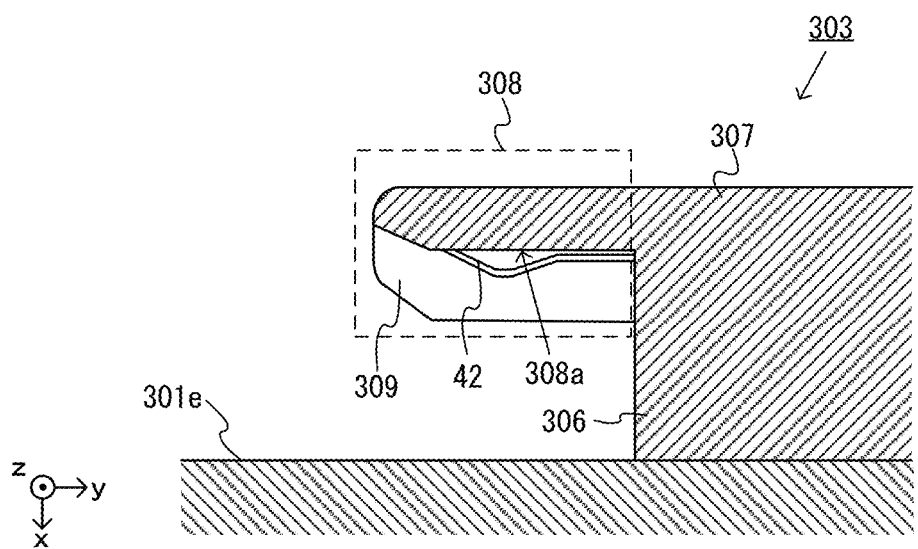
FIG. 15 is a diagram schematically showing an example of a cross section in the vicinity of the lower end of the non-limiting fixed portion.

FIG. 15 is a diagram schematically showing an example of a cross section in the vicinity of the lower end of the fixed portion. FIG. 15 is a diagram schematically showing an example of a partial cross section of the fixed portion 303 taken along C-C' shown in FIG. 14. As shown in FIG. 15, in the present embodiment, the second left controller 6 includes terminals 42 provided on the fixed portion 303. Specifically, as shown in FIG. 15, the fixed portion 303 includes the protruding portion 308 at the lower end portion of the fixed portion 303. The protruding portion 308 is provided so as to protrude in the slide direction (more specifically, in the lower direction, i.e., the y-axis negative direction) from the top surface portion 307. The protruding portion 308 is provided on one side of the fixed portion 303 farther away from the body section 301 (i.e., the x-axis positive direction side). That is, the protruding portion 308 is provided spaced apart from the body section 301. As shown in FIG. 15, the protruding portion 308 includes an opposing surface 308a facing toward the body section 301. The opposing surface 308a opposes a predetermined surface of the second left controller 6 (specifically, the first right side surface 301e).

As shown in FIG. 15, the terminals 42 are provided between the opposing surface 308a and the predetermined surface. More specifically, in the present embodiment, the terminals 42 are provided on the opposing surface 308a. The terminals 42 are arranged so that one side thereof facing the body section 301 is exposed. The terminals 42 are arranged on the reverse side of the fixed portion 303 (specifically, the protruding portion 308). With the terminals 42 arranged so that one side thereof facing the body section 301 is exposed, as described above, it is possible to reduce the possibility that the terminals 42 come into contact with a hand of the user or other objects, thereby protecting the terminals 42. Note that as shown in FIG. 15, the distal end of the terminals 42 is located on the inner side relative to the distal end of the protruding portion 308 (specifically, the top on the y-axis negative direction side) in the slide direction. This also makes it possible to protect the terminals 42.

Figure 16:
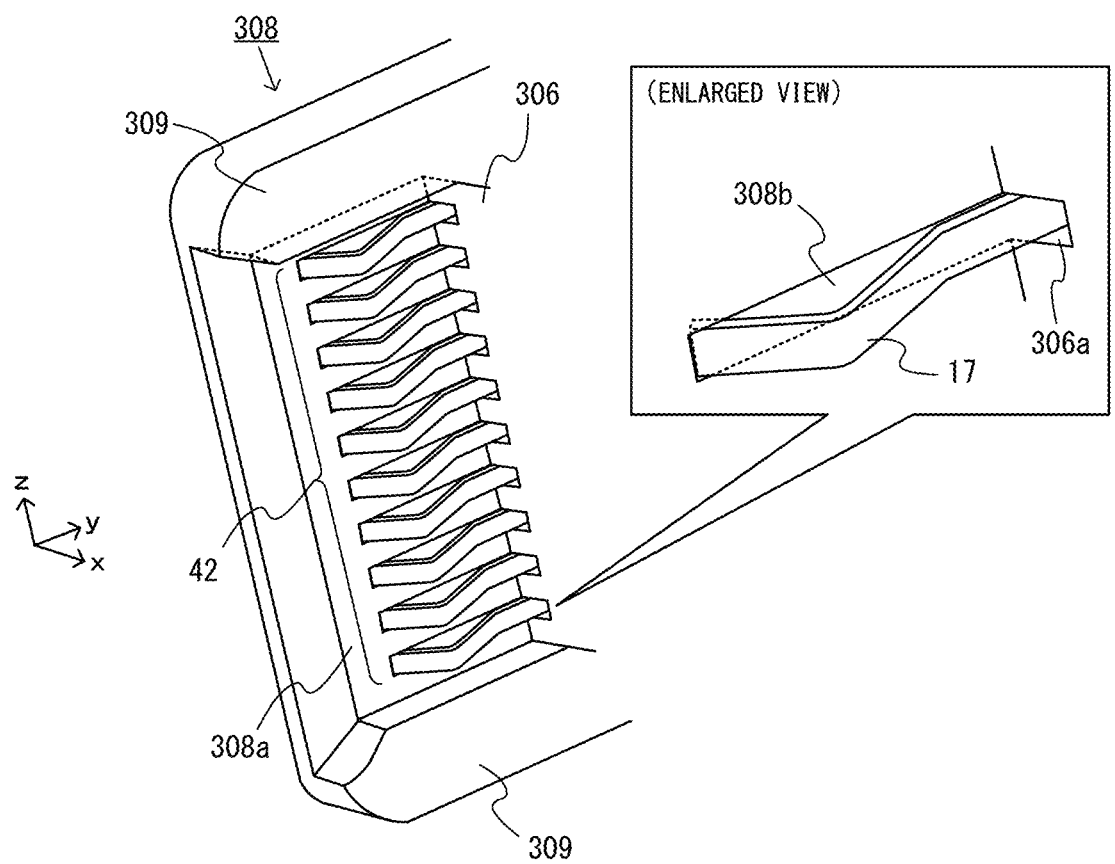
FIG. 16 is a perspective view showing an example of terminals provided in a non-limiting protruding portion.

FIG. 16 is a perspective view showing an example of the terminals provided on the protruding portion. FIG. 16 shows the protruding portion 308 as seen from the reverse side (i.e., the side of the opposing surface 308a). As shown in FIG. 15 and FIG. 16, the protruding portion 308 includes wall portions 309. The wall portions 309 are provided on the opposing surface 308a on both sides with respect to the direction that is parallel to the opposing surface 308a and substantially perpendicular to the slide direction (i.e., the z-axis direction). With the wall portion 309, it is possible to further reduce the possibility that the terminals 42 come into contact with a hand of the user or other objects, thereby more reliably protecting the terminals 42.

As shown in the enlarged view of FIG. 16, holes 306a are provided on the surface of the shaft 306 of the fixed portion 303 on which the protruding portion 308 is provided (i.e., the end surface on y-axis negative direction side). The terminals 42 are provided so as to protrude from the inside of the fixed portion 303 via the holes 306a. The same number of slits 308b as the number (herein, ten) of the terminals 42 are formed on the opposing surface 308a of the protruding portion 308. The slits 308b are connected to the holes 306a. The slits 308b are formed so as to extend in the slide direction (i.e., the y-axis direction). As shown in FIG. 16, the slits 308b are arranged next to each other in a direction that is parallel to the opposing surface 308a and perpendicular to the slide direction (i.e., the z-axis direction).

As shown in FIG. 16, the terminals 42 are provided on the opposing surface 308a along the slits 308b. The terminals 42 are arranged next to each other in a direction perpendicular to the slide direction (i.e., the z-axis direction), as are the slits 308b. In the present embodiment, the terminals 42 are provided so that a portion thereof (e.g., a distal end portion) is in the slits 308b while the other portion is outside the slits 308b (FIG. 15 and FIG. 16). Herein, when the terminals 42 of the second left controller 6 are connected to the left-side terminals 17 of the main body apparatus 2 in the state where the second left controller 6 is attached to the main body apparatus 2 (referred to as the "attached state"), the terminals 42 are pressed and deformed by the left-side terminals 17 to move in the direction toward the slits 308b (i.e., the x-axis negative direction). That is, each terminal 42 is bent so that at least a part of the terminal 42 lies in a slit 308b provided on the opposing surface 308a. It can be said that the slits 308b are provided so that the terminals 42 being deformed can be retracted so that the terminals 42 will not be in contact with the opposing surface 308a. Thus, although the terminals 42 are not in contact with the opposing surface 308a in the present embodiment, they are provided at positions corresponding to the slits 308b provided on the opposing surface 308a, and are provided at such positions that they would be in contact with the opposing surface 308a without the slits 308b. In this sense, in the present embodiment, it can be said that the terminals 42 are provided on the opposing surface 308a. Note that in other embodiments, the slits 308b may be absent on the opposing surface 308a, and the terminals 42 may be provided so as to be in contact with the opposing surface 308a. As shown in FIG. 16, the terminals 42 extend along the opposing surface 308a.

As shown in FIG. 14, the pivoting portion 304 is connected to the fixed portion 303. In the present embodiment, the pivoting portion 304 is connected to the upper end portion of the fixed portion 303 (in other words, the upper end portion of the shaft 306). As does the fixed portion 303, the pivoting portion 304 also has a shape such that it can slidably engage with the main body rail member 29. Note that the direction in which the pivoting portion 304, in engagement with the main body rail member 29 of the main body apparatus 2, can slide will be hereinafter referred to as the "slide direction (of the pivoting portion 304)". The axis that passes through the pivoting portion 304 (more specifically, the center of the pivoting portion 304) and that is parallel to the slide direction of the pivoting portion 304 is referred to as the "slide axis (of the pivoting portion 304)". Therefore, the pivoting portion 304 can slidably engage with the main body rail member 29 in the direction along the slide axis of the pivoting portion 304. An example of a specific configuration of the pivoting portion 304 will now be described.

Enlarged view B shown in FIG. 14 is an enlarged view of the pivoting portion 304 as seen from the distal end side (specifically, an end portion that is opposite to the end portion that is connected to the fixed portion 303) of the pivoting portion 304. As shown in Enlarged view B, as is the fixed portion 303, the pivoting portion 304 is shaped so that a cross section thereof taken perpendicular to the slide direction is generally T-shaped. Specifically, the pivoting portion 304 includes a shaft 316 and a top surface portion 317. As shown in Enlarged view B, the shaft 316 is provided to protrude from a movable casing 319 to be described later. The top surface portion 317 is provided on one side of the shaft 316 that is away from the body section 301 (i.e., the x-axis negative direction side). The length of the top surface portion 317 in the width direction (specifically, the direction that is perpendicular to the slide direction of the pivoting portion 304 and perpendicular to the z-axis direction) is greater than the width of the shaft 316. The end portion of the top surface portion 317 in the width direction is located so as to protrude past (in other words, located on the outer side of) the end of the shaft 316 in the z-axis direction. With the shape described above, as is the fixed portion 303, the pivoting portion 304 in engagement with the main body rail member 29 of the main body apparatus 2 is locked on the main body rail member 29 so as not to come off in the direction perpendicular to the slide direction.

As shown in FIG. 11, the shaft 316 of the pivoting portion 304 is provided at substantially the same position as the shaft 306 of the fixed portion 303 with respect to the x-axis direction (in other words, the direction perpendicular to the first right side surface 301e), and the top surface portion 317 of the pivoting portion 304 is provided at substantially the same position as the top surface portion 307 of the fixed portion 303 with respect to the x-axis direction. Therefore, when the slide axis of the fixed portion 303 and the slide axis of the pivoting portion 304 are aligned on the same straight line, the fixed portion 303 and the pivoting portion 304 can be both engaged with the main body rail member 29.

As shown in FIG. 14, the pivoting portion 304 is a bar-shaped member extending along the slide axis. The shaft 316 and the top surface portion 317 are provided so as to extend along the slide axis of the pivoting portion 304. In the present embodiment, as with the fixed portion 303, the slide axis of the pivoting portion 304 is provided substantially parallel to the first right side surface 301e of the body section 301.

As shown in FIG. 11 and FIG. 14, on one end portion of the pivoting portion 304 that is connected to the fixed portion 303, the shaft 316 is provided and the top surface portion 317 is absent. Thus, the top surface portion 317 does not need to be provided over the entirety in the slide direction of the pivoting portion 304. In other embodiments, as with the top surface portion 317, the shaft 316 also does not need to be provided over the entirety in the slide direction of the pivoting portion 304. Note that one end portion of the pivoting portion 304 that is connected to the fixed portion 303 is not connected to the movable casing 319.

Figure 17:
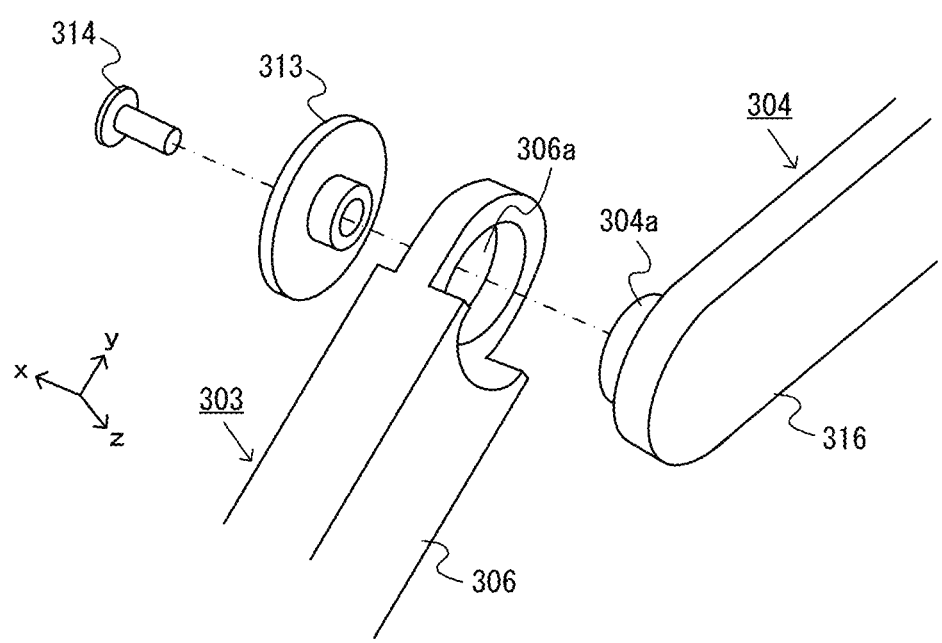
FIG. 17 is a diagram schematically showing an example of a connecting portion between the non-limiting fixed portion and the non-limiting pivoting portion.

In the present embodiment, the pivoting portion 304 is pivotally connected to the fixed portion 303. Referring to FIG. 17, an example of a configuration with which the fixed portion 303 and the pivoting portion 304 are pivotally connected together will now be described.

FIG. 17 is a diagram schematically showing an example of a connecting portion between the fixed portion and the pivoting portion. As shown in FIG. 17, a substantially circular hole 306a is formed in the vicinity of the upper end portion of the fixed portion 303 (specifically, the shaft 306). The pivoting portion 304 (specifically, the shaft 316) includes a shaft 304a that can be inserted into the hole 306a of the fixed portion 303, at one end portion of the pivoting portion 304 that is connected to the fixed portion 303. The shaft 304a is provided to extend in a direction (i.e., the x-axis direction) that is substantially perpendicular to the first right side surface 301e on which the fixed portion 303 is provided. The diameter of the shaft 304a is set to be substantially equal to the diameter of the hole 306a of the fixed portion 303 (or slightly smaller than the diameter of the hole). The slide member 302 includes a fastening disc 313 and a fastening screw 314. The fastening disc 313 has a circular shape that is larger than the hole 306a of the fixed portion 303.

As shown in FIG. 17, the pivoting portion 304 is connected to the fastening disc 313 by the fastening screw 314, with the shaft 304a inserted in the hole 306a of the fixed portion 303. That is, the shaft 304a is provided at the upper end portion of the fixed portion 303. Then, an upper end portion of the fixed portion 303 (in other words, a portion around the hole 306a) is sandwiched between the pivoting portion 304 and the fastening disc 313. With such a configuration, the pivoting portion 304 can pivot about the shaft 304a. Specifically, since the shaft 304a to be the pivoting axis is oriented in a direction that is substantially perpendicular to the first right side surface 301e (i.e., the x-axis direction), the pivoting portion 304 pivots about the x axis relative to the fixed portion 303.

Note that there is no limitation on the pivoting mechanism used for pivotally connecting together the fixed portion 303 and the pivoting portion 304. For example, in other embodiments, a hole may be provided in one end portion of the pivoting portion 304, and a shaft that can be inserted in the hole may be provided on an upper end portion of the fixed portion 303.

While the slide member 302 of the second left controller 6 has one axis of rotation in the present embodiment, the slide member 302 may have two or more axes of rotation in other embodiments. For example, in other embodiments, the slide member includes a fixed portion, a first pivoting portion and a second pivoting portion. Then, as in the present embodiment, the fixed portion is fixed to the body section 301. The first pivoting portion is pivotally connected to the fixed portion. Note that one end of the first pivoting portion is connected to the upper end of the fixed portion, and the other end of the first pivoting portion is connected to one end of the second pivoting portion. The second pivoting portion is pivotally connected to the first pivoting portion. Note that the fixed portion and at least one of the first pivoting portion and the second pivoting portion may be shaped so that they can slidably engage with the main body rail member 29 of the main body apparatus 2.

Note that as shown in Enlarged view of FIG. 14, the second left controller 6 includes a stop member 318. In the present embodiment, the stop member 318 is provided on the pivoting portion 304. The stop member 318 is provided to stop the slide movement of the second left controller 6 against the main body apparatus 2 while the second left controller 6 is attached to the main body apparatus 2. The details of the stop member 318 will be described later.

As shown in FIG. 11, FIG. 13 and FIG. 14, the pivoting portion 304 includes the movable casing 319. The movable casing 319 is fixed to the shaft 316 of the pivoting portion 304. Herein, as shown in FIG. 13, the inclined surface 301b of the body section 301 is provided so that the right side of the inclined surface 301b is located on the left side relative to the right side of the non-inclined surface 301a of the body section 301. That is, the second right side surface 301f, which is in contact with the inclined surface 301b, of the right side surface of the body section 301, is provided so as to have a step relative to the first right side surface 301e, which is in contact with the non-inclined surface 301a. Specifically, as the right side surface of the body section 301 is seen from the right side (i.e., the x-axis negative direction side), the second right side surface 301f is provided on the far side relative to the first right side surface 301e. Therefore, the second right side surface 301f and the shaft 316 are spaced apart from each other. The movable casing 319 is provided between the second right side surface 301f and the shaft 316. Note that in the present embodiment, the movable casing 319 is provided so that there is substantially no gap between the movable casing 319 and the body section 301 (FIG. 13).

(Configuration for Restricting Pivot of Pivoting Portion 304)

As shown in FIG. 13, the second left controller 6 includes a projecting portion 321. The projecting portion 321 is provided on the body section 301 so as to project from the second right side surface 301f. Specifically, the amount (in other words, length) by which the projecting portion 321 projects from the second right side surface 301f is set to be greater than the gap in the x-axis direction between the movable casing 319 and the body section 301 (there is substantially no gap in the present embodiment as described above). In the present embodiment, the projecting portion 321 is provided on the rear side of the second right side surface 301f (in other words, the side of the reverse surface of the body section 301). The projecting portion 321 is provided so as to restrict the pivot of the pivoting portion 304.

Figure 18:
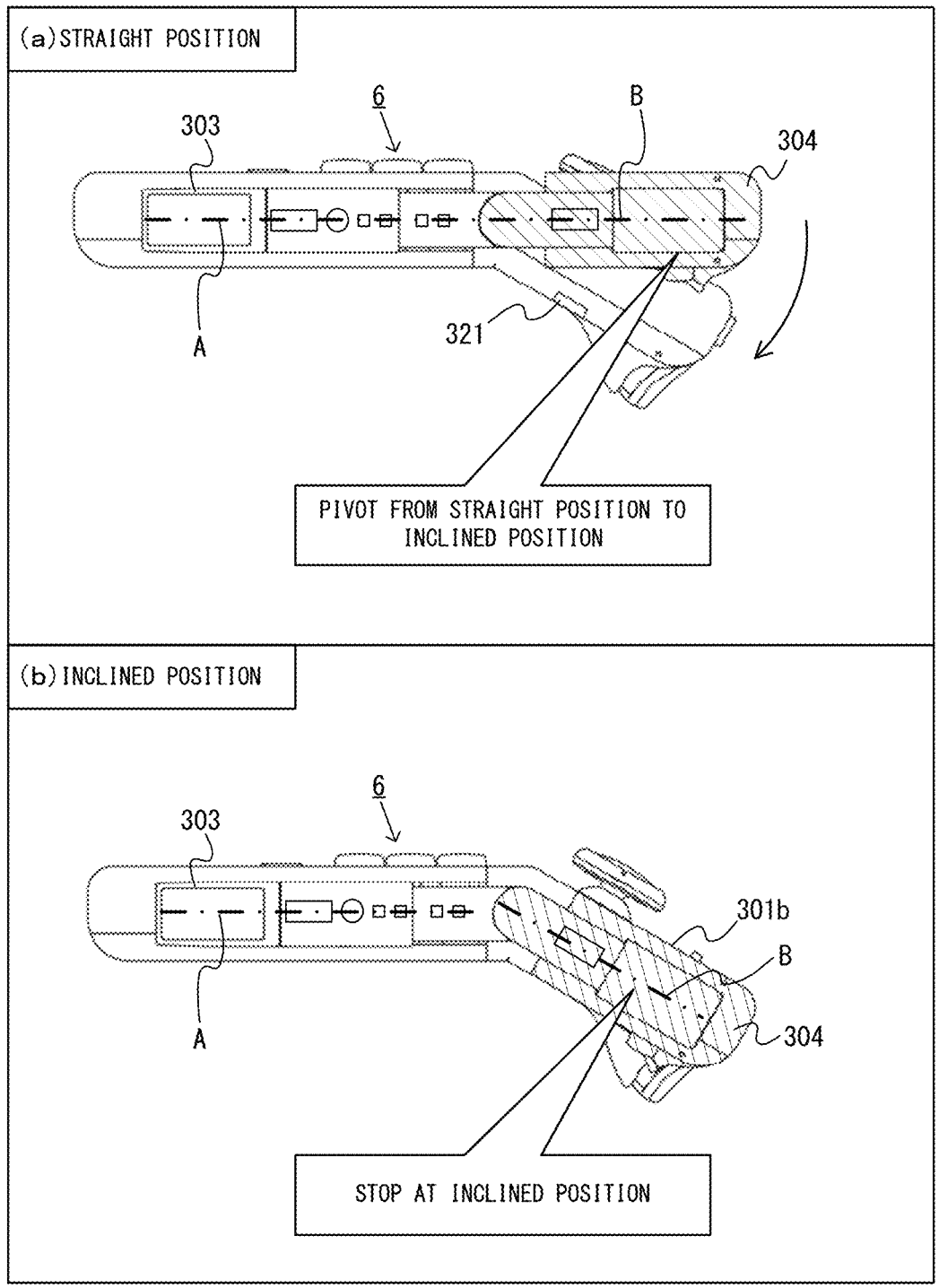
FIG. 18 is a diagram showing an example of how the non-limiting pivoting portion pivots.

FIG. 18 is a diagram showing an example of how the pivoting portion pivots. Note that the pivoting portion 304 is hatched in FIG. 18 so that the pivoting portion 304 is more conspicuous. In the present embodiment, the pivoting portion 304 can pivot in a predetermined pivoting direction (i.e., a pivoting direction about the x axis), and can assume a straight position and an inclined position as shown in FIG. 18. The straight position is a position in which the slide axis of the fixed portion 303 (one-dot-chain line A shown in FIG. 18) and the slide axis of the pivoting portion 304 (one-dot-chain line B shown in FIG. 18) are aligned on the same straight line ((a) shown in FIG. 18). That is, when the pivoting portion 304 is in the straight position, the slide direction of the fixed portion 303 and the slide direction of the pivoting portion 304 coincide with each other. In other words, the straight position is a position in which the fixed portion 303 and the pivoting portion 304 can at the same time engage with the main body rail member 29.

On the other hand, the inclined position is a position in which the slide axis of the pivoting portion 304 is inclined with respect to the slide axis of the fixed portion 303 ((b) shown in FIG. 18). When the pivoting portion 304 is in the inclined position, the slide axis of the pivoting portion 304 forms a predetermined angle (e.g., 30°) other than the straight angle relative to the slide axis of the fixed portion 303. More specifically, in the present embodiment, the inclined position is a position in which the slide axis of the pivoting portion 304 (in other words, the slide direction of the pivoting portion 304) is substantially parallel to the inclined surface 301b of the body section 301 ((b) shown in FIG. 18). In other words, the inclined position can be said to be a position in which the pivoting portion 304 does not protrude relative to the front surface of the body section 301, and a position in which the pivoting portion 304 is farther back (in other words, on the back surface side) relative to the front surface of the body section 301 (more specifically, the inclined surface 301b). In the present embodiment, the pivoting portion 304 can pivot at least over a range from the straight position to the inclined position. In other words, the slide member 302 can change its shape between a straight-line shape and a shape in which a portion thereof (i.e., the pivoting portion 304) is inclined.

As shown in FIG. 14 and FIG. 18, the connecting portion between the fixed portion 303 and the pivoting portion 304 is provided at a position corresponding to the boundary portion between the inclined surface 301b and the non-inclined surface 301a with respect to the slide direction of the slide member 302 (i.e., the y-axis direction). In other words, the position of the connecting portion between the fixed portion 303 and the pivoting portion 304 and the position of the boundary portion between the inclined surface 301b and the non-inclined surface 301a substantially coincide with each other for the longitudinal direction (i.e., the slide direction) of the body section 301. Note that the boundary portion can be said to be the position of bending of the body section 301 that has a bent shape. As described above, since the pivoting portion 304 pivots about the boundary portion as the axis of pivot, the pivoting portion 304 can be placed along the inclined surface 301b. Therefore, when the pivoting portion 304 is in the inclined position, the pivoting portion 304 does not protrude from the inclined surface 301b.

Note that the fixed portion 303 is fixed to the body section 301 and the slide direction of the fixed portion 303 does not change (i.e., always oriented in the y-axis direction), whereas the pivoting portion 304 can pivot and the slide direction of the pivoting portion 304 changes as the pivoting portion 304 pivots. Although the details will be described later, when the second left controller 6 is attached to the main body apparatus 2, the slide axis of the fixed portion 303 and the slide axis of the pivoting portion 304 are substantially parallel to each other. That is, the slide direction of the fixed portion 303 and the slide direction of the pivoting portion 304 substantially coincide with each other. Therefore, the "slide direction" as in "the slide member 302 slidably engages with the main body rail member 29 in a predetermined slide direction" refers to the slide direction of the fixed portion 303, in other words, the slide direction of the pivoting portion 304 when it substantially coincides with the slide direction of the fixed portion 303.

The projecting portion 321 is provided at such a position that the projecting portion 321 is in contact with the movable casing 319 when the pivoting portion 304 is in the inclined position. Specifically, a portion of the back surface side of the movable casing 319 is cut out in substantially the same shape as the shape of the projecting portion 321, and when the pivoting portion 304 is in the inclined position, the projecting portion 321 is in contact with the movable casing 319 while being inserted into the cut-out portion of the movable casing 319. Thus, when the pivoting portion 304 reaches the inclined position by pivoting from the straight position to the inclined position, the projecting portion 321 comes into contact with the movable casing 319 of the pivoting portion 304. With the projecting portion 321 in contact with the movable casing 319, the pivot of the pivoting portion 304 is stopped at the inclined position ((b) shown in FIG. 18). Thus, in the present embodiment, the projecting portion 321 restricts the pivoting portion 304, which pivots in the direction from the straight position to the inclined position (see the arrow shown in FIG. 18) from pivoting past the inclined position.

As described above, in the present embodiment, the second left controller 6 includes a first restricting portion (specifically, the projecting portion 321) that restricts the pivot of the pivoting portion 304 at a predetermined position (specifically, the inclined position) in which the slide axis of the pivoting portion 304 is inclined relative to the slide axis of the fixed portion 303 as compared with the straight position. More specifically, the first restricting portion restricts the pivot of the pivoting portion 304, which has pivoted from the straight position to the predetermined position, at the predetermined position. Then, it is possible to reduce the possibility that the pivoting portion 304 may pivot to a position past the predetermined position (in other words, past the range from the straight position to the predetermined position), and the pivoting portion 304 is unlikely to hinder the user. For example, it is possible to reduce the possibility that the pivoting portion 304 at a position past the predetermined position may get damaged by hitting something or getting caught on something.

Note that in other embodiments, the predetermined position at which the first restricting portion restricts the pivot of the pivoting portion 304 may be a position different from the inclined position. For example, the first restricting portion may stop the pivot of the pivoting portion 304 at a position between the straight position and the inclined position, or may stop the pivot of the pivoting portion 304 at a position near the inclined position (strictly speaking, it may be a position past the inclined position). Also in this case, as in the present embodiment, the pivoting portion 304 is unlikely to hinder the user.

In other embodiments, the second left controller 6 may include a second restricting portion that restricts the pivot of the pivoting portion 304 at the straight position. More specifically, the second restricting portion restricts the pivot of the pivoting portion 304, which has pivoted from the predetermined position to the straight position, at the straight position. Then, it is possible to reduce the possibility that the pivoting portion 304 may pivot to a position past the straight position (in other words, past the range from the straight position to the predetermined position). Therefore, it is easier for the user to place the pivoting portion 304 in the straight position, and to move the slide member 302 into a shape such that the pivoting portion 304 can be attached to the main body apparatus 2. Thus, it is easier for the user to perform the operation of attaching the second left controller 6 to the main body apparatus 2. Since the pivoting portion 304 is unlikely to pivot to a position past the straight position, the pivoting portion 304 is unlikely to hinder the user.

Note that there is no limitation on the specific configuration of the second restricting portion. For example, the second left controller 6 may include a projection as the second restricting portion. The projection may be provided on the upper end portion of the fixed portion 303, for example, and may be provided so that the projection is in contact with the movable casing 319 when the pivoting portion 304 is in the straight position.

(Configuration for Holding Position of Pivoting Portion)

As shown in the front view of FIG. 13, the body section 301 is provided with a first magnet 322, and the movable casing 319 is provided with a second magnet 323. The first magnet 322 is provided, inside the casing of the body section 301, in the vicinity of a surface (i.e., the second right side surface 301*o* that opposes the movable casing 319 of the pivoting portion 304 in the inclined position. The second magnet 323 is provided, inside the movable casing 319, in the vicinity of a surface (referred to as the "pivoting-side opposing surface") that opposes the body section 301 when the pivoting portion 304 is in the inclined position. In the present embodiment, the first magnet 322 and the second magnet 323 are arranged inside the casing so that they are not visible from outside the second left controller 6. Note however that in other embodiments, the magnets 322 and 323 may be provided exposed on the outside of the second left controller 6. For example, the first magnet 322 may be provided on the second right side surface 301*f*, and the second magnet 323 may be provided on the pivoting-side opposing surface.

The first magnet 322 and the second magnet 323 are oriented so that their polarities are opposite to each other (in other words, so that there is magnetic attraction between the two magnets). For example, where the first magnet 322 is provided so that the N pole thereof is facing the second magnet 323 when the pivoting portion 304 is in the inclined position, the second magnet 323 is provided so that the S pole thereof is facing the first magnet 322. Then, there is magnetic attraction between the second right side surface 301*f* of the body section 301 and the pivoting-side opposing surface of the movable casing 319. Therefore, with no force acting upon the pivoting portion 304, the pivoting portion 304 is held (in other words, maintained) in the inclined position by the magnetic attraction between the magnets 322 and 323. In other words, the pivoting portion 304 is urged toward the inclined position by the magnetic attraction between the magnets 322 and 323. Note that the magnets 322 and 323 do not need to hold (in other words, move) the pivoting portion 304 in the inclined position in a strict sense, but may only hold the pivoting portion 304 around the inclined position.

As described above, in the present embodiment, the second left controller 6 includes a holding portion (specifically, the first magnet 322 and the second magnet 323) for holding the pivoting portion in a hold position (specifically, the inclined position). Note that the holding portion can be said to give the pivoting portion 304 a holding force for holding the pivoting portion 304 in a hold position. According to the present embodiment, with no force, other than the gravity, acting upon the pivoting portion 304, the pivoting portion 304 is held in the inclined position, and it is therefore possible to reduce the possibility that the pivoting portion 304 may flap around and hinder the user. Note that the holding portion releases the hold of the pivoting portion 304 in the inclined position upon receiving a force of a certain magnitude or more acting upon the pivoting portion 304. That is, the pivoting portion 304 can pivot even when the second left controller 6 includes the holding portion.

Note that in other embodiments, the holding portion may be any component other than magnets. For example, when an engagement hole is provided on one of the second right side surface 301*f* and the pivoting-side opposing surface, a projection that can engaged with the engagement hole may be provided on the other surface as the holding portion. The projection is provided at a position such that the projection is inserted in and engaged with the engagement hole when the pivoting portion 304 is in the inclined position. Therefore, as the projection engages with the engagement hole, the pivoting portion 304 is held in the inclined position. Note that the projection may be biased so as to protrude from the surface on which the projection is provided, and may be able to move in the retracting direction upon receiving a force in the opposite direction. As described above, the holding portion may be a projection as described above, and it is possible, also in such a case, to hold the pivoting portion 304 in the inclined position.

In other embodiments, the holding portion may be an elastic member (e.g., a rubber) provided on at least one of the second right side surface 301*f* and the pivoting-side opposing surface. When the pivoting portion 304 is in the inclined position, the elastic member presses a surface that opposes the surface on which the elastic member is provided (i.e., the second right side surface 301*f* or the pivoting-side opposing surface). The pivoting portion 304 is held in the inclined position by the frictional force between the elastic member and the surface pressed by the elastic member.

Note that the holding portion may hold the pivoting portion 304 in a position that is different from the inclined position and the straight position. Irrespective of the position at which the pivoting portion 304 is held by the holding portion, it is possible to reduce the possibility that the pivoting portion 304 may flap around and hinder the user.

The components functioning as the holding portion (i.e., the magnet, the projection and the elastic member) have the function of stopping the pivot of the pivoting portion 304 in the inclined position. That is, these components can each be said to be the first restricting portion described above. Note that the projecting portion 321 in the present embodiment prohibits the pivot of the pivoting portion 304 past the inclined position unless the projecting portion 321 is broken, or the like. In contrast, the components described above do not prohibit the pivot of the pivoting portion 304 past the inclined position, but apply a certain force so that the pivoting portion 304 stays in the inclined position. That is, the first restricting portion may prohibit the pivot of the pivoting portion 304 past the inclined position or not prohibit the pivot past the inclined position.

The first magnet 322 and the second magnet 323 have the function of biasing the pivoting portion 304 toward the inclined position (from the current position of the pivoting portion 304). That is, the first magnet 322 and the second magnet 323 can be said to be a biasing portion for biasing the pivoting portion 304 in the direction from the straight position toward the inclined position. With the biasing portion, the pivoting portion 304 can be moved to the inclined position, without the user moving the pivoting portion 304, it is possible to save the trouble of the user who wishes to move the pivoting portion 304 to the inclined position.

Note that in other embodiments, the biasing portion may be a component other than a magnet, e.g., an elastic member such as a spring. Specifically, the biasing portion may be a twisted coil spring provided at the axis of rotation of the pivoting portion 304 (i.e., the shaft 304*a*). The second left controller 6 may include an elastic member for biasing the pivoting portion 304, instead of (or together with) the first magnet 322 and the second magnet 323.

When the second left controller 6 includes the first restricting portion (i.e., the projecting portion 321) and an elastic member that functions as the biasing portion, the pivoting portion 304 that is biased by the elastic member in the direction from the straight position toward the inclined position is stopped in the inclined position by the projecting portion 321. As a result, the pivoting portion 304 is held in the inclined position. Thus, the first restricting portion and the elastic member may function as the holding portion. That is, the holding portion may be composed of the first restricting portion and the elastic member.

In other embodiments, the projecting portion 321 may include a hook that can be engaged with the pivoting portion 304. Specifically, when the pivoting portion 304 is in the inclined position, the hook is engaged with the movable casing 319 of the pivoting portion 304 to prevent the pivoting portion 304 from pivoting in the direction from the inclined position to the straight position. Therefore, in such a case, the pivoting portion 304 is restricted by the projecting portion 321 from pivoting past the inclined position (more specifically, past the range from the straight position to the inclined position), and is restricted by the hook of the projecting portion 321 from pivoting in the direction from the inclined position to the straight position. Note that the user can pivot the pivoting portion 304 in the direction from the inclined position to the straight position by applying a force of a magnitude such that the hook is disengaged. As described above, the projecting portion 321 may have both the function as the first restricting portion and the function as the holding portion.

In other embodiments, the biasing portion may bias the pivoting portion 304 in the direction from the inclined position to the straight position. For example, the first magnet 322 and the second magnet 323 may be arranged so as to hold the pivoting portion 304 in the straight position. The twisted coil spring may be provided so as to bias the pivoting portion 304 in the direction from the inclined position toward the straight position. Note that when the second left controller 6 includes the second restricting portion and a twisted coil spring that biases the pivoting portion 304 in the direction from the inclined position toward the straight position, the pivoting portion 304 is held in the straight position when there is no force acting upon the pivoting portion 304.

(Operation Sections Provided on Slide Member 302)

As shown in FIG. 11 and FIG. 13, as does the first left controller 3, the second left controller 6 includes operation sections on the slide member 302. The operation sections are provided on the engaging surface of the slide member 302 (i.e., the surface that opposes the main body apparatus 2 when the slide member 302 is attached to the main body apparatus 2; specifically, the surface that faces the x-axis negative direction side). Specifically, the second left controller 6 includes the second R-button 44 and a pairing button 325 on the fixed portion 303 (more specifically, the top surface portion 307). In the present embodiment, the pairing button 325 is used to instruct a setting process (referred to also as a pairing process) for the wireless communication between the second left controller 6 and the main body apparatus 2.

Note that in the present embodiment, the engaging surface of the slide member 302 includes an upper-tier surface and a lower-tier surface. The upper-tier surface is a surface that is located farther away from the body section 301 (i.e., as compared with the lower-tier surface), and the lower-tier surface is a surface that is located closer to the body section 301 (i.e., as compared with the upper-tier surface). The engaging surface of the slide member 302 includes an inclined surface that connects together the upper-tier surface and the lower-tier surface. The buttons 44 and 325 provided on the engaging surface of the slide member 302 are provided so as not to protrude relative to the upper-tier surface. That is, the buttons are provided on the lower-tier surface or the inclined surface, and the upper surface of each button (i.e., the surface on the x-axis negative direction side; in other words, the surface to be pressed) is arranged flush with the upper-tier surface or arranged at a position sunken from the upper-tier surface. This allows the slide member 302 to slide smoothly against the main body rail member 29 when the slide member 302 is inserted in the main body rail member 29 of the main body apparatus 2.

As shown in FIG. 13, the second left controller 6 includes an indicator LED 326 on the fixed portion 303 (four indicator LEDs in the present embodiment). The indicator LED 326 is an indicator section for indicating predetermined information to the user. There is no limitation on the information to be indicated by the indicator LED 326. For example, in the present embodiment, the indicator LED 326 shows the user identification information of the controller (e.g., the number assigned to the controller) when the main body apparatus 2 communicates with a plurality of controllers. Note that in the present embodiment, two of the four indicator LEDs are provided on the top surface portion 307, and the remaining two indicator LEDs are provided on the shaft 306. Note however that there is no limitation on the arrangement of the indicator LEDs 326.

As shown in FIG. 11 and FIG. 13, the second L-button 43 is provided on the pivoting portion 304. In the present embodiment, the second L-button is provided on the shaft 316 and is provided so as not to protrude past the top surface portion 317. That is, the upper surface of the second L-button (i.e., the surface on the x-axis negative direction side; in other words, the surface to be pressed) is arranged flush with the upper surface of the top surface portion 317 (i.e., the surface on the x-axis negative direction side) or arranged at a position sunken from the surface.

As described above, in the present embodiment, operation sections are provided on the pivoting portion 304. Therefore, the second left controller 6 includes a transmission section for detecting an operation performed using the second L-button 43 to transmit a signal representing the operation from the pivoting portion 304 to the body section 301. Specifically, in the present embodiment, the transmission section is a flexible printed circuit board 327, which is a film-shaped substrate.

Figure 19:
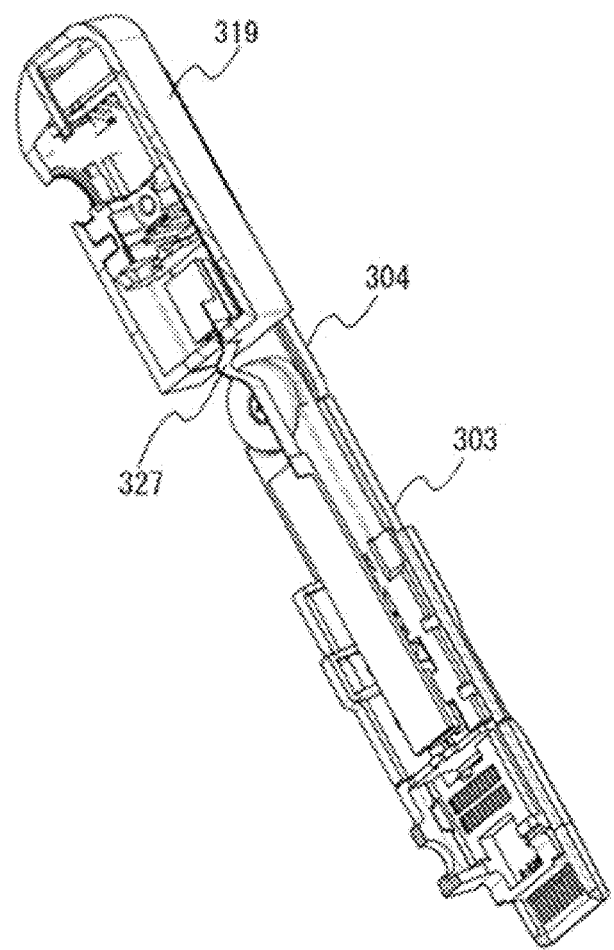
FIG. 19 is a diagram showing an example of the internal configuration of a non-limiting slide member.

FIG. 19 is a diagram showing an example of the internal configuration of the slide member (the fixed portion and the pivoting portion). As shown in FIG. 19, the flexible printed circuit board 327 is provided so as to extend between the movable casing 319 and the fixed portion 303. That is, a portion of the flexible printed circuit board 327 (i.e., the first portion) is provided inside the movable casing 319, and another portion of the flexible printed circuit board 327 (i.e., the second portion) extends out of the movable casing 319, with still another portion of the flexible printed circuit board 327 (i.e., the third portion) provided inside the fixed portion 303. Thus, in the present embodiment, since the pivoting portion 304 pivots relative to the fixed portion 303, the fixed portion 303 and the pivoting portion 304 are electrically connected to each other by the flexible printed circuit board 327 that can be bent.

Note that in the present embodiment, the second portion of the flexible printed circuit board 327, which is between the first portion inside the movable casing 319 and the third portion inside the fixed portion 303, is exposed on the outside of the second left controller 6. Note however that in other embodiments, the flexible printed circuit board 327 may be provided so as not to be exposed on the outside of the second left controller 6. For example, the flexible printed circuit board 327 may be provided so as to extend from the inside of the shaft 316 of the pivoting portion 304, through the inside of the pivoting mechanism, and into the inside of the shaft 306 of the fixed portion 303.

The flexible printed circuit board 327 detects an operation performed using the second L-button 43 in the first portion provided inside the movable casing 319. The flexible printed circuit board 327 detects an operation performed using the second R-button 44 and an operation performed using the pairing button 325 in the third portion provided inside the fixed portion 303. Although not shown in the figures, the flexible printed circuit board 327 is electrically connected to a communication controller 101 provided inside the body section 301. The flexible printed circuit board 327 outputs, to the communication controller 101, signals representing operations performed using the second L-button 43, the second R-button 44 and the pairing button 325. The flexible printed circuit board 327 is electrically connected to the indicator LED 326, and turns ON/OFF the indicator LED 326 based on control instructions from the communication controller 101.

[2-1-3. Stop Member]

As shown in Enlarged view B of FIG. 14, the second left controller 6 includes the stop member 318. The stop member 318 is a member that stops the slide movement of the slide member 302 of the second left controller 6 against the main body apparatus 2 in the attached state.

The stop member 318 is provided on the upper portion (in other words, the pivoting portion 304) the slide member 302 (Enlarged view B of FIG. 14). Note that the position of the stop member 318 is determined based on the position of the stop-receiving portion (i.e., the cut-out portion C1 shown in FIG. 9) of the main body rail member 29 of the main body apparatus 2. That is, the position of the stop member 318 is determined so that the stop member 318 is located at the cut-out portion C1 of the main body rail member 29 in the attached state. If the stop member 318 is provided in an upper portion of the slide member 302 as in the present embodiment, it is possible to shorten the period of time over which the stop member 318 is in contact with the main body rail member 29 when the slide member 302 is inserted into the main body rail member 29. Thus, the user can smoothly slide the slide member 302. Note that there is no limitation on the position of the stop member 318, and the stop member 318 may be provided in a lower portion of the slide member 302 (e.g., the fixed portion 303) in other embodiments.

As shown in Enlarged view B of FIG. 14, the stop member 318 is provided so as to protrude from the side surface of the shaft 316 (i.e., the surface perpendicular to the width direction of the shaft 316) of the slide member 302. The stop member 318 is provided so as to protrude from the right side surface of the movable casing 319. Thus, the stop member 318 is provided so as to protrude from the side surface of the slide member 302 and the right side surface of the movable casing 319. Specifically, a hole is provided so as to extend over the side surface of the shaft 316 and the right side surface of the movable casing 319, and at least a portion of the stop member 318 is provided so as to protrude from the hole (Enlarged view B of FIG. 14). Note that the stop member 318 may be provided so as to protrude from only one of the side surface of the slide member 302 and the right side surface of the movable casing 319.

In the present embodiment, the stop member 318 is movable (Enlarged view B of FIG. 14). Specifically, the stop member 318 is movable between the protruding state in which the stop member 318 protrudes from the side surface of the shaft 316, and the retracted state in which the stop member 318 has moved toward the inside of the side surface from the position in the protruding state. Note that the retracted state may be a state where the stop member 318 is somewhat retracted inside the shaft 316 or may be a state where the stop member 318 is completely retracted. Therefore, the protruding state can be said to be a state in which the stop member 318 is more protruding than in the retracted state. Note that in other embodiments, the stop member 318 may be movable in the direction perpendicular to the right side surface of the movable casing 319. Then, the stop member 318 is brought into the retracted state by moving toward the inside of the movable casing 319.

In the present embodiment, the stop member 318 is biased by an elastic member (e.g., a spring) toward the protruding state. For example, the stop member 318 can be biased toward the protruding state by providing a spring, inside the pivoting portion 304, so as to be on the inner side relative to the stop member 318 and in contact with the stop member 318. In other embodiments, the stop member 318 may be a member that is provided to protrude from the side surface of the slide member 302 and/or the right side surface of the movable casing 319 and that itself deforms upon receiving an external force.

As shown in FIG. 13, the second left controller 6 includes a release button 328. The release button 328 is an example of a movable member that can be moved by an operation by the user. The release button 328 is provided on the movable casing 319. Although not shown in the figures, the release button 328 is configured so that it can be moved in conjunction with the stop member 318. Note that the stop member 318 and the release button 328 may be formed as an integral unit. For example, a groove along which the stop member 318 and the release button 328 can move is provided in the pivoting portion 304. The stop member 318 and the release button 328 are provided so as to be movable in a predetermined direction (i.e., the direction of movement shown in FIG. 14) along the groove. Therefore, the release button 328 is pressed, the stop member 318 also moves, together with the release button 328.

Thus, in the present embodiment, in a state where the release button 328 is not pressed, the stop member 318 is in the protruding state, and the stop member 318 is brought into the retracted state in response to the release button 328 being pressed.

Where the second left controller 6 is attached to the main body apparatus 2, when the stop member 318 is in the retracted state, the stop member 318 is not engaged (or not substantially engaged) with the cut-out portion C1 of the main body rail member 29. Therefore, in the retracted state, the engagement (in other words, the lock) by the stop member 318 is released. Thus, the user can release the lock by the stop member 318 by pressing the release button 328 to bring the stop member 318 into the retracted state.

[2-2. Second Right Controller]

As shown in FIG. 12, the second right controller 7 has a similar configuration to the second left controller 6 except for the arrangement of the operation sections, etc. Specifically, the second right controller 7 includes a body section 401 and a slide member 402.

In the present embodiment, the shape of the body section 401 of the second right controller 7 is in left-right symmetry with the body section 301 of the second left controller 6. Note however that the body section 401 does not need to be in left-right symmetry in a strict sense with the body section 301. As does the front surface of the body section 301 the front surface of the body section 401 includes a non-inclined surface 401a and an inclined surface 401b. As does the first right controller 4, the second right controller 7 includes the window portion 68 on the lower surface of the body section 401.

The slide member 402 is detachably attachable to a rail portion provided on the right side surface of the main body apparatus 2. As shown in FIG. 12, the slide member 402 includes a fixed portion 403 and a pivoting portion 404. The configuration of the slide member 402 of the second right controller 7 is similar to that of the slide member 302 of the second left controller 6 except that they are opposite to each other in the front-rear direction (i.e., the z-axis direction shown in FIG. 12).

As shown in FIG. 12, the second right controller 7 includes the analog stick 52 and the home button 58 provided on the non-inclined surface 401a, and the operation buttons 53 to 55 and the "+" (plus) button 57 provided on the inclined surface 401b. The first R-button 60 is provided on the upper right portion of the body section 401, and the ZR button (not shown) is provided on the rear side of the first R-button 60 (i.e., the z-axis positive direction side shown in FIG. 12). Although not shown in the figures, the second L-button and the pairing button are provided on the fixed portion 403. The second R-button is provided on the pivoting portion 404.

As described above, as does the second left controller 6, the second right controller 7 also has a shape such that the body section 401 can be held easily. While in the non-attached state, the pivoting portion 404 is in the inclined position, and the pivoting portion 404 is therefore unlikely to hinder the user and is easily held by the user. Since the pivoting portion 404 can assume the straight position, the slide member 402 can be inserted into the rail portion of the main body apparatus 2, allowing the second right controller 7 to be attached to the main body apparatus 2.

[3. Use of Second Controller]

Operations to be performed when the second controller is used will now be described. As with the first controller, the second controller can be used while detached from the main body apparatus 2 (referred to as the "non-attached state") and can be used while attached to the main body apparatus 2 (i.e., the attached state").

[3-1. Use in Non-Attached State]

Figure 20:
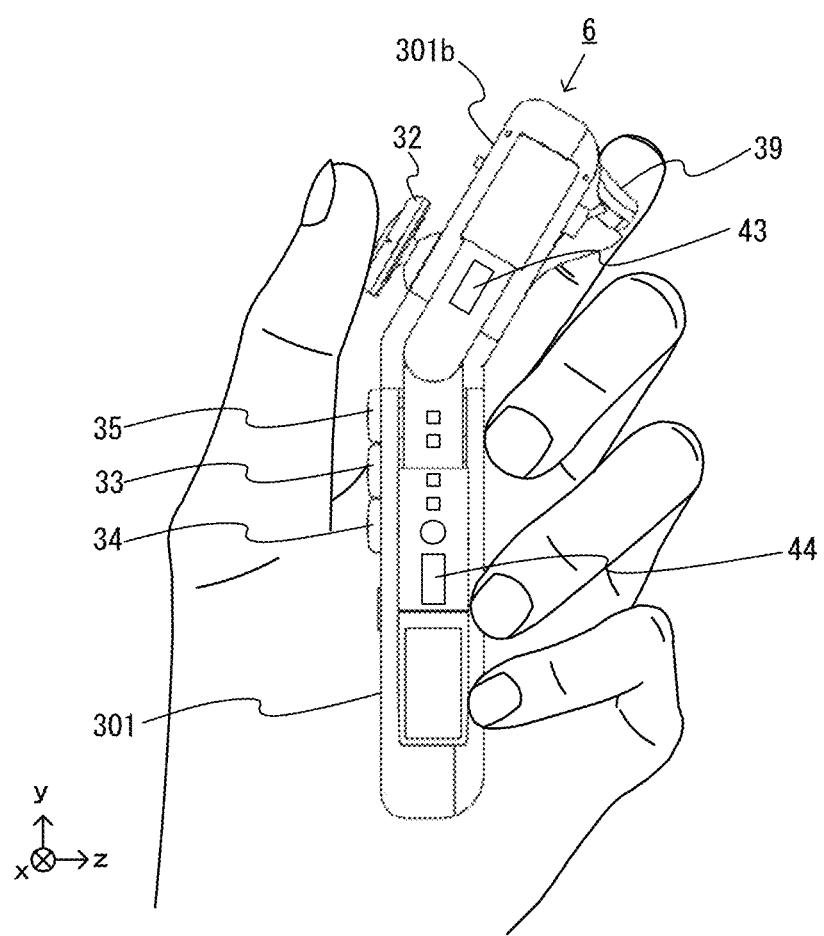
FIG. 20 is a diagram showing an example of how the user holds the non-limiting second left controller in the non-attached state.

FIG. 20 is a diagram showing an example of how the user holds the second left controller 6 in the non-attached state. Note that FIG. 20 shows how the user holds the second left controller 6 with one hand. In FIG. 20, it can be said that the user is holding the second left controller 6 in the vertical position (i.e., the longitudinal direction of the controller is generally the vertical direction).

In FIG. 20, the user holds the body section 301 in the palm. That is, the body section 301 can be said to be the hold portion to be held by the user. In FIG. 20, the user can use the second left controller 6 while holding the body section 301, with the thumb placed so that the analog stick 32 can be operated with the thumb, and with the index finger placed so that the first L button 38 or the ZL button 39 can be operated with the index finger. Note that when the second left controller 6 is held in the vertical position, the user can operate the operation buttons 33 to 36 with the thumb, and can operate the second L-button 43 and the second R-button 44 with any finger other than the thumb.

With the second left controller 6, since the upper portion of the body section 301 is bent toward the far side (i.e., the z-axis positive direction side shown in FIG. 20), it is easier for the user to hold the second left controller 6. With the second left controller 6, the analog stick 32 is provided on the inclined surface 301*b*. In the present embodiment, the length over which the analog stick 32 protrudes from the body section 301 is greater than the length over which the operation buttons 33 to 36 protrudes from the body section 301. Thus, with the second left controller 6, the analog stick 32, which has a large amount of protrusion, is provided on the inclined surface 301*b*, and it is therefore easy for the user to operate the analog stick 32.

Note that although not shown in the figures, also when the user holds the second left controller 6 with both hands in the horizontal position (i.e., the longitudinal direction of the controller is generally the horizontal direction), it is easier to hold the second left controller 6, as in the vertical position. That is, the user can use the second left controller 6 while holding the inclined surface 301*b* portion of the body section 301 with the left hand and the non-inclined surface 301*a* portion with the right hand, with the thumb of the left hand placed so that the analog stick 32 can be operated with the thumb, and with the thumb of the right hand placed so that the operation buttons 33 to 36 can be operated with the thumb. Thus, when the second left controller 6 is held in the horizontal position, the body section 301 of the left controller 6 can be held easily because there is an angle formed between the inclined surface 301*b* held by the left hand and the non-inclined surface 301*a* held by the right hand.

Note that in the non-attached state, when the pivoting portion 304 is in a position other than the inclined position, the pivoting portion 304 pivots to the inclined position by the magnets 322 and 323, which function as the biasing portion. When the pivoting portion 304 is in the inclined position while in the non-attached state, the pivoting portion 304 is held in the inclined position by the magnets 322 and 323, which function as the holding portion. Thus, in the non-attached state, the pivoting portion 304 is placed in the inclined position. Therefore, in the non-attached state, since the pivoting portion 304 is placed to extend along the shape of the body section 301, the pivoting portion 304 is unlikely to hinder the user when holding the second left controller 6, and the user can easily hold the second left controller 6.

[3-2. Use in Attached State]

Next, a case where the second controller is used while attached to the main body apparatus 2 will be described. When the second left controller 6 is attached to the main body apparatus 2, the user first inserts the lower end of the slide member 302 of the second left controller 6 (specifically, the lower end of the fixed portion 303) into the insertion hole at the upper end of the main body rail member 29 of the main body apparatus 2. After the fixed portion 303 of the second left controller 6 is inserted in the main body rail member 29, the user moves the fixed portion 303 toward the far end (the y-axis negative direction side in FIG. 8) of the main body rail member 29.

Figure 21:
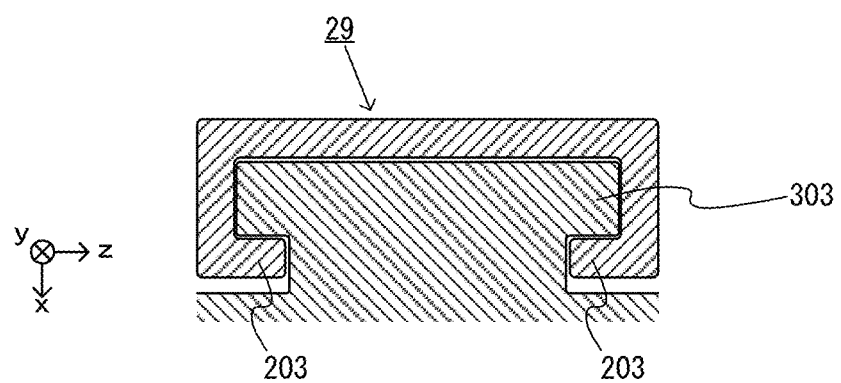
FIG. 21 is a diagram schematically showing an example of the state where the slide member of the non-limiting controller is in engagement with the slide member of the non-limiting main body apparatus.

FIG. 21 is a diagram schematically showing an example of the state where the slide member of the controller is in engagement with the slide member of the main body apparatus 2. Note that FIG. 21 shows a cross section of the fixed portion 303 of the second left controller 6 and the main body rail member 29 of the main body apparatus 2. When the slide member 302 (the fixed portion 303 in the example shown in FIG. 21) of the second left controller 6 is inserted in the main body rail member 29, the main body rail member 29 and the fixed portion 303 are in engagement with each other as shown in FIG. 21. In this state, the fixed portion 303 in engagement with the main body rail member 29 is slidable in the slide direction (i.e., the y-axis direction) and is locked by the top surface portion 203 of the main body rail member 29 so as not to come off in the direction perpendicular to the slide direction (i.e., the x-axis direction).

As the fixed portion 303 inserted in the main body rail member 29 is moved toward the far end of the main body rail member 29, the pivoting portion 304 starts to be inserted in the main body rail member 29. Then, the pivoting portion 304 hits the main body rail member 29, and the pivoting portion 304 pivots in the direction from the inclined position to the straight position. Then, when the fixed portion 303 is inserted somewhat toward the far end into the main body rail member 29, the pivoting portion 304 gradually assumes the straight position as it is inserted into the main body rail member 29. Then, when the distal end of the fixed portion 303 reaches the far end of the main body rail member 29, the attached state is achieved where the second left controller 6 is attached to the main body apparatus 2.

Figure 22:
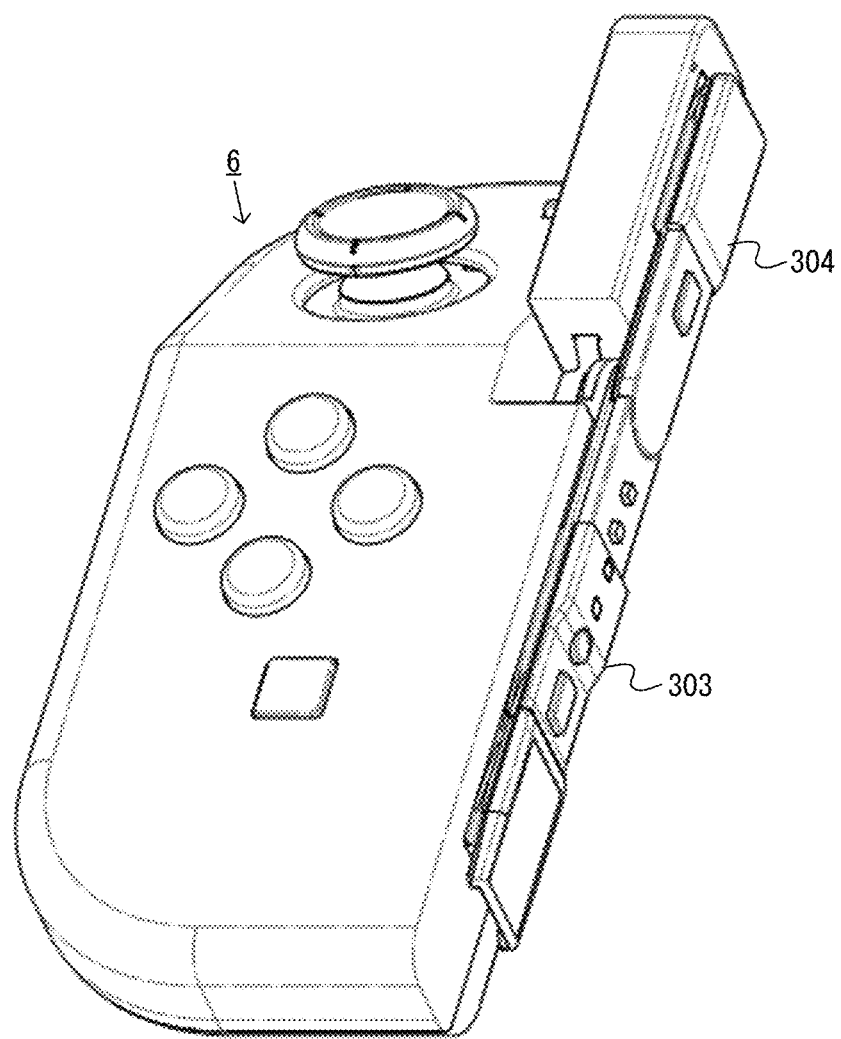
FIG. 22 is a diagram showing an example of the non-limiting second left controller in the attached state.
Figure 23:
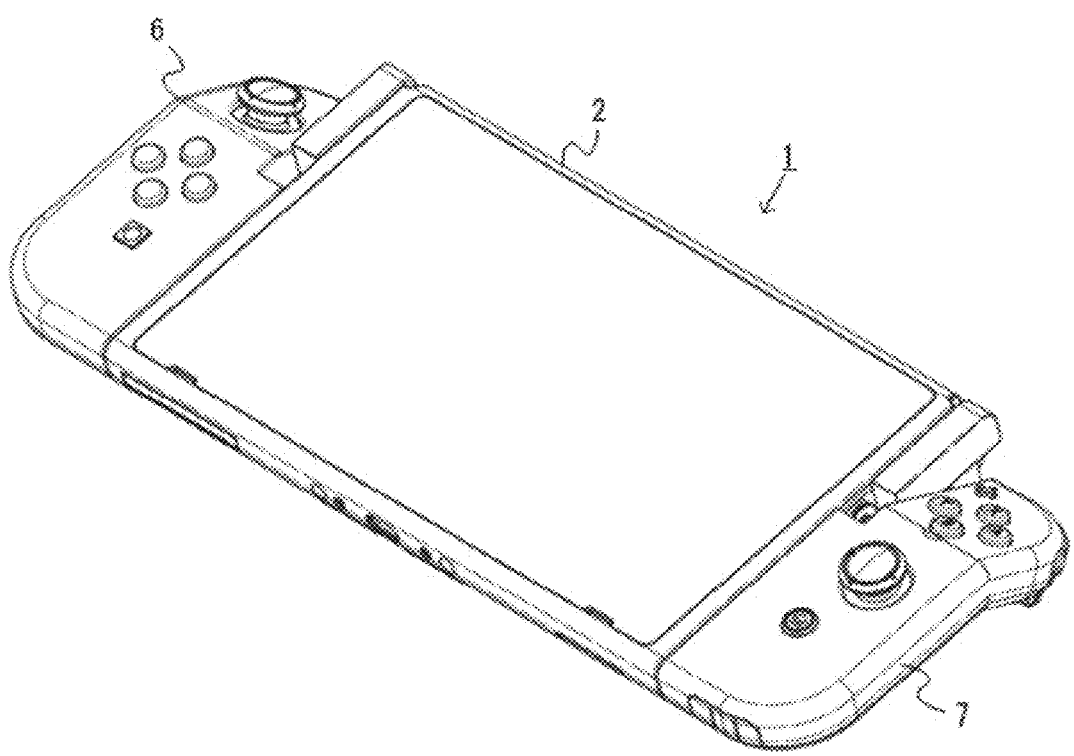
FIG. 23 is a diagram showing an example of a game system in which non-limiting second controllers are attached to the non-limiting main body apparatus.

FIG. 22 is a diagram showing an example of the second left controller 6 in the attached state. FIG. 23 is a diagram showing an example of a game system where the second controllers are attached to the main body apparatus 2. Note that FIG. 22 only shows the second left controller 6, and does not show the main body apparatus 2, so that the second left controller 6 is more conspicuous. As shown in FIG. 22, when the second left controller 6 is attached to the main body apparatus 2, the pivoting portion 304 is in the straight position, and the fixed portion 303 and the pivoting portion 304, which are slide members of the second left controller 6, are co-linear with each other (i.e., the slide axis of the fixed portion 303 and the slide axis of the pivoting portion 304 are aligned on the same straight line).

In the attached state, the stop member 318 is located so as to correspond to the cut-out portion C1 formed in the main body rail member 29. Therefore, in the attached state, the stop member 318 is in the protruding state and is engaged with the cut-out portion C1 of the main body rail member 29. Thus, the stop member 318 stops the slide movement of the slide member 302 of the second left controller 6 in the removal direction (i.e., the direction in which the slide member 302 is removed from the main body rail member 29, in other words, the direction opposite to the direction in which the slide member 302 is inserted into the main body rail member 29). Thus, the stop member 318 can engage (in other words, lock) the second left controller 6 on the main body apparatus 2.

Note that the stop member 318 can assume the retracted state, and the stop member 318 is held in the retracted state by contacting the top surface portion 203 of the main body rail member 29 while the slide member 302 of the second left controller 6 is being inserted into or being removed from the main body rail member 29. Therefore, in such a state, the second left controller 6 can be smoothly slid against the main body apparatus 2.

In the attached state, the leaf spring 205 provided on the main body rail member 29 is in contact with the slide member of the second left controller 6, pushing the second left controller 6 in a direction away from the main body apparatus 2. Thus, it is possible to reduce the looseness between the main body apparatus 2 and the second left controller 6, and it is possible to firmly connect the main body apparatus 2 and the second left controller 6 to each other.

Note that while the description above is directed to an example where the second left controller 6 is attached to the main body apparatus 2, the second right controller 7 can also be attached to the main body apparatus 2 in a similar manner to that with the second left controller 6.

Figure 24:
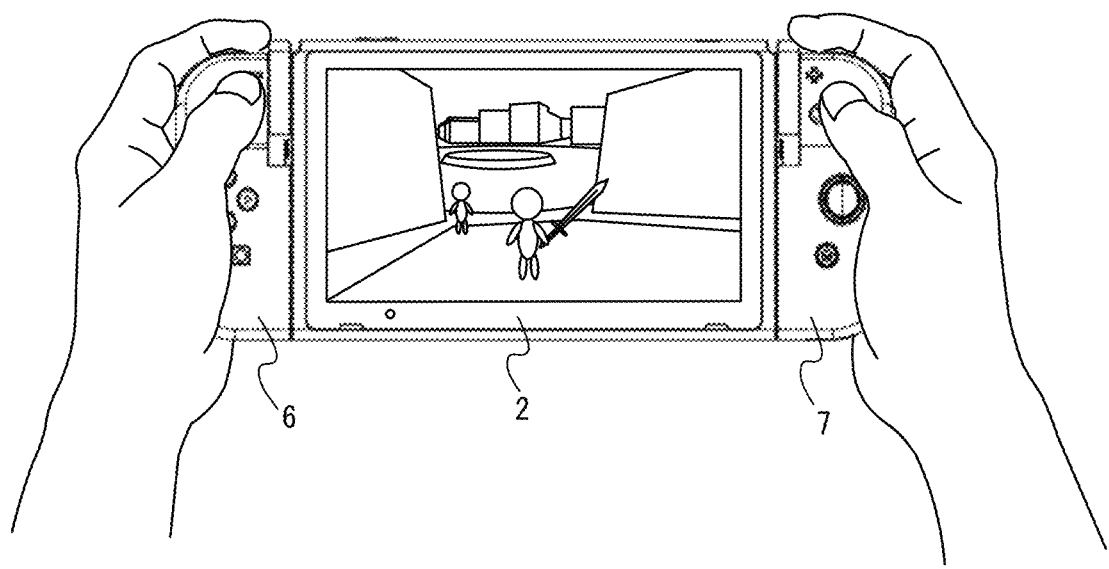
FIG. 24 is a diagram showing an example of how the user holds the game system in which non-limiting second controllers are attached to the non-limiting main body apparatus.

FIG. 24 is a diagram showing an example of how the user holds the game system in which the second controllers are attached to the main body apparatus 2. In FIG. 24, the user holds the second left controller 6 attached to the main body apparatus 2 in the left hand, and holds the second right controller 7 attached to the main body apparatus 2 in the right hand. As shown in FIG. 24, the user can hold the second controllers also in the attached state in a similar manner to that in the non-attached state (FIG. 20). Herein, since the upper portions of the body sections of the second controllers are bent toward the far side, it is easier for the user to hold the second controllers. Moreover, it is easier to operate the operation sections (the analog stick 32 or the operation buttons 53 to 56, etc.) provided on the inclined surfaces of the second controllers.

Note that although two, left and right, second controllers are attached to the main body apparatus 2 in FIG. 24, one first controller and one second controller may be attached to the main body apparatus 2.

When removing the second left controller 6 from the main body apparatus 2, the user presses the release button 328 described above. The release button 328, in response to being operated by the user, moves the stop member 318 from the position of the protruding state to the position of the retracted state. In response to the release button 328 being pressed, the stop member 318 is brought into the retracted state, thereby releasing the state in which the stop member 318 stops the slide movement of the slide member in the removal direction, as described above. Then, the user can more easily (than when the stop member 318 stops the slide movement) slide the second left controller 6 in the removal direction. Therefore, by sliding the second left controller 6 in a state where the release button 328 has been pressed to release the stop, the user can easily remove the second left controller 6 from the main body apparatus 2. Note that the second right controller 7 can also be removed from the main body apparatus 2 in a similar manner to that with the second left controller 6.

Note that when the second left controller 6 is removed from the main body apparatus 2, the pivoting portion 304 is configured to pivot. Since the main body apparatus 2 includes the first magnet 322 and the second magnet 323 in the present embodiment, the pivoting portion 304 pivots to the inclined position and the inclined position is maintained (unless a force is applied thereto) by the magnetic attraction between the magnets 322 and 323. Thus, in the present embodiment, when the second left controller 6 is removed from the main body apparatus 2, the pivoting portion 304 moves to the inclined position, in which the pivoting portion 304 is unlikely to hinder the user, without being moved by the user. According to the present embodiment, the user conveniently does not need to move the pivoting portion 304 to the inclined position.

[4. Functions/Effects and Variations of Present Embodiment]

According to the embodiment described above, the game controller (i.e., the second controller) is removably attachable to the main unit 2 having the main unit-side slide member (e.g., the main body rail member 29) and configured to execute game processes. The game controller includes the operation sections (e.g., the analog stick 32) and the controller-side slide member (e.g., the slide member 302). The controller-side slide member is configured to slidably engage with the main unit-side slide member in a slide direction. The controller-side slide member has a first end and a second end in the slide direction, and the game controller is configured to be attached to the main unit by inserting the controller-side slide member into the main unit-side slide member from the first end (e.g., the end on the y-axis negative direction side shown in FIG. 11). The controller-side slide member includes the fixed portion 303 that protrudes from a surface of the game controller and is fixed to the surface, and the pivoting portion 304 that is connected to the fixed portion 303 and is configured to pivot relative to the fixed portion 303.

According to the embodiment described above, the pivoting portion 304, which is a part of the slide member 302, can pivot, and therefore the shape of the slide member 302 (in other words, the orientation of the pivoting portion 304 relative to the fixed portion 303) can be changed. Herein, the design of the shape of the controller is limited by the shape of the slide member 302. For this, according to the embodiment described above, the degree of freedom in the shape of the slide member 302 is increased, and it is possible to improve the degree of freedom in the shape of the controller.

(Variation Regarding Shape of Body Section)

In the embodiment described above, the front surface of the body section 301 of the second left controller 6 is bent in an upwardly-protruding shape. Specifically, the front surface of the body section 301 includes two planes, i.e., the inclined surface 301b, on which operation sections (i.e., the analog stick 32) are provided, and the non-inclined surface 301a, which is not parallel to the inclined surface (in other words, inclined by a predetermined angle relative to the inclined surface 301b as seen from a direction perpendicular to the side surface). Note that the bent portion of the front surface of the body section 301 (i.e., the boundary portion between the non-inclined surface 301a and the inclined surface 301b) may be chamfered. That is, the boundary portion may be a curved surface. Then, the boundary portion can be said to be a curved portion. In other embodiments, the front surface of the body section 301 may include no flat surface, as will be illustrated below.

Figure 25:
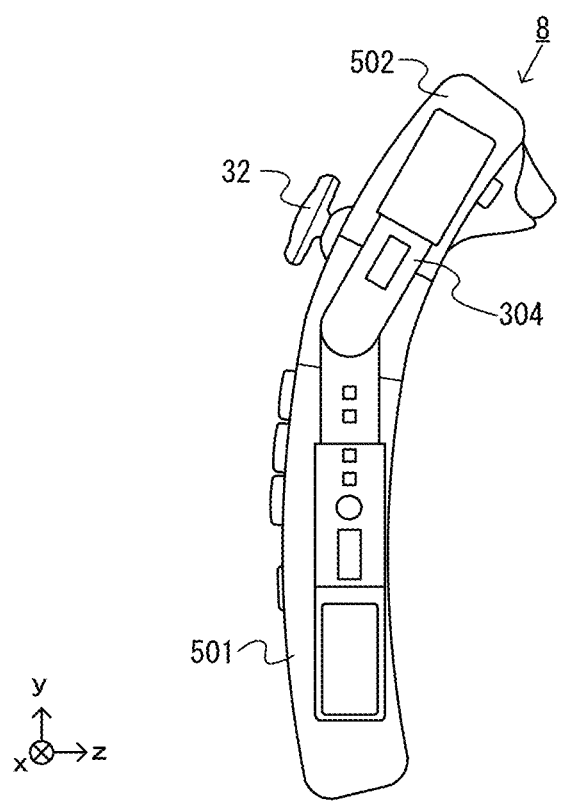
FIG. 25 is a diagram showing an example of the non-limiting left controller according to a first variation of the embodiment.

FIG. 25 is a diagram showing an example of a third left controller according to a first variation of the embodiment described above. As shown in FIG. 25, a third left controller 8 of the first variation includes a body section 501 and a movable casing 502. Note that the third left controller 8 is similar to the second left controller 6 of the embodiment described above except for the shapes of the body section 501 and the movable casing 502.

As shown in FIG. 25, the front surface of the body section 501 is curved in an upwardly-protruding shape. In other words, the front surface of the body section 501 includes an upwardly-protruding curved surface. Operation sections (the analog stick 32, etc.) are provided on this curved surface. The front surface of the body section 501 is a curved surface that is protruding toward the front side (i.e., the z-axis negative direction side shown in FIG. 25). In other words, the front surface of the body section 501 has its opposite ends in the up-down direction (i.e., the y-axis direction shown in FIG. 25) retracted rearward, with the portion between the opposite ends protruding.

Note that in the present embodiment, "a surface bent (or curved) in an upwardly-protruding shape" refers to a surface having an apex at a certain point thereon, wherein away from the apex toward opposite ends in a certain direction, the surface is located gradually toward the far side (which can be said to be the back surface side assuming that this surface is the front surface). Note however that portions of the surface do not need to be located more toward the far side relative to the apex in all directions (i.e., across 360 degrees). For example, in the embodiment described above, the front surface of the body section 301 has an apex at a point on the boundary between the non-inclined surface 301*a* and the inclined surface 301*b*, wherein the surface is located more toward the far side further away from the apex toward opposite ends in the up-down direction (i.e., the y-axis direction) of the body section 301, and the front surface can therefore be said to be a "surface bent in an upwardly-protruding shape".

Note that in the first variation, the entire front surface of the body section 501 is an upwardly-protruding curved surface. Herein, in other embodiments, a portion of the front surface of the body section 501 may be an upwardly-protruding curved surface. For example, a portion of the front surface of the body section 501 over a range in the up-down direction where the slide member is provided may be an upwardly-protruding curved surface. Alternatively, a portion of the front surface of the body section 501 over a range in the up-down direction where predetermined operation sections (e.g., the analog stick 32 and the operation buttons 33 to 36) are provided may be an upwardly-protruding curved surface.

As described above, the body section of the left controller may be bent to protrude forward (e.g., the embodiment described above) or may be curved to protrude forward (e.g., the first variation). Thus, it is easier for the user to hold the body section.

In the first variation, the movable casing 502 is configured to have a curved surface in accordance with the shape of the body section 501. That is, as shown in FIG. 25, the movable casing 502 is provided so that the front surface of the body section 501 and the front surface of the movable casing 502 substantially coincide with each other as seen from the horizontal direction (i.e., the x-axis direction shown in FIG. 25), when the pivoting portion 304 is in the inclined position. Thus, when the pivoting portion 304 is in the inclined position, the movable casing 502 is unlikely to hinder the user. Note that in other embodiments, the movable casing 502 may be provided so as not to protrude past the body section 501 as seen from the horizontal direction when the pivoting portion 304 is in the inclined position.

(Variation Regarding Range of Pivot of Pivoting Portion)

Note that in the embodiment described above and in the first variation, the pivoting portion 304 can pivot between the straight position and the inclined position. Therefore, according to the embodiment described above and the first variation, the pivoting portion 304 can pivot to a position (i.e., the straight position) in which the left controller can be attached to the main body apparatus 2, and the pivoting portion 304 can also pivot to the predetermined position in which the pivoting portion 304 is unlikely to hinder the user.

Note that in other embodiments, the pivoting portion 304 does not need to be configured to pivot between the straight position and the inclined position, but may be configured to pivot between the straight position and a predetermined position. The predetermined position is a position between the straight position and the inclined position (this position is different from the straight position and the inclined position). The predetermined position is a position that is reached when the pivoting portion 304 pivots in such a direction (i.e., the direction from the straight position to the inclined position, in other words, the direction in which the pivoting portion 304 moves from the front surface side to the back surface side) that the amount by which the pivoting portion 304 protrudes from the front surface of the body section 301 (more specifically, the inclined surface 301*b*) decreases from the amount of protrusion (in other words, the length of protrusion) of the pivoting portion 304 in the straight position. In other words, as the pivoting portion 304 moves from the straight position to the predetermined position, the length by which the pivoting portion 304 protrudes from the front surface of the body section 301 becomes shorter, and the portion of the pivoting portion 304 that protrudes from the front surface becomes smaller. Therefore, as the pivoting portion 304 is in the predetermined position, the pivoting portion 304 is unlikely to hinder the user (as compared with a state in which the pivoting portion 304 is in the straight position). Thus, also when the pivoting portion 304 is configured to pivot between the straight position and the predetermined position, it is possible to realize an advantageous effect that the pivoting portion 304 is unlikely to hinder the user, as in the embodiment described above.

(Variation Regarding Grip Portion)

Figure 26:
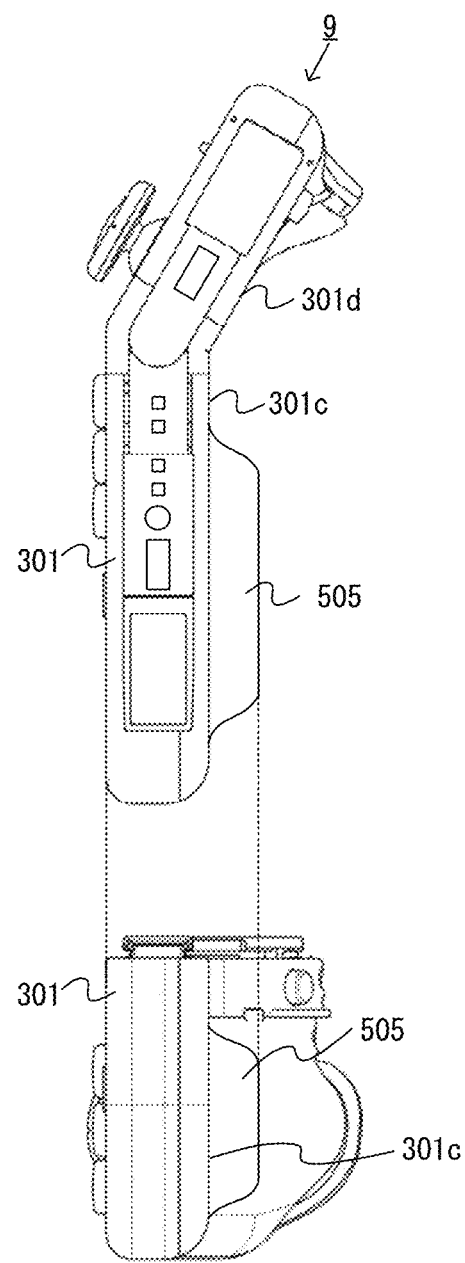
FIG. 26 is a diagram showing an example of the non-limiting left controller according to a second variation of the embodiment.

FIG. 26 is a diagram showing an example of the left controller according to a second variation of the embodiment described above. Note that FIG. 26 includes a diagram of the left controller of the second variation as seen from the right side, and a diagram thereof as seen from the lower side. As shown in FIG. 26, a left controller 9 according to the second variation includes a grip portion 505 on the reverse surface 301*c* of the body section 301. As shown in FIG. 26, the grip portion 505 has a protruding surface that protrudes past the reverse surface 301*c*. The protruding surface can be held by a hand of the user (i.e., it protrudes to such an extent that it can be held by a hand of the user). According to the second variation, it is easier for the user to hold the body section 301 by placing a hand on the grip portion 505 (in other words, place the hand on the surface of the grip portion 505).

Note that in the second variation, the grip portion 505 is provided at least on the lower side portion of the reverse surface of the body section 301. Then, the user can hold the controller by placing the middle finger, the ring finger and/or the little finger, for example, on the grip portion 505, making it easier to hold the body section 301. Note that in other embodiments, there is no limitation on the position where the grip portion 505 is provided, and the grip portion 505 may be provided so as to extend over the reverse surface 301c and the reverse surface 301d, for example. The grip portion 505 may be of any protruding shape.

In FIG. 26, the body section 301 includes the reverse surface 301c, which is a flat surface. Note however that in other embodiments, the reverse surface of the body section 301 may entirely be a protruding surface without including a flat surface.

In FIG. 26, the grip portion 505 is formed as an integral unit with the casing of the body section 301. Note however that in other embodiments, the grip portion 505 may be an accessory that can be attached to and detached from the body section 301. In such a case, for example, the grip portion 505 may be configured so that it can be attached to and detached from the controller by means of a slide member (e.g., a slide member similar to the main body rail member 29) that can be attached to and detached from the slide member of the controller.

(Variation Regarding Arrangement of Fixed Portion and Pivoting Portion)

In the embodiment described above, the fixed portion 303 is provided on the lower end side (i.e., the y-axis negative direction side shown in FIG. 13) of the slide member of the second left controller 6, and the pivoting portion 304 is provided on the upper end side. The terminals 42 are provided on the protruding portion 308, which is provided at the lower end of the fixed portion 303. Herein, in other embodiments, the arrangement of the fixed portion and the pivoting portion may be reversed (i.e., the fixed portion is provided on the upper end side of the slide member of the controller and the pivoting portion is provided on the lower end side) as will be described below.

In the variation where the arrangement of the fixed portion and the pivoting portion is reversed, of the right side surface of the body section of the second left controller 6, the first right side surface on the side of the non-inclined surface is at a position sunken from the second right side surface on the side of the inclined surface. The fixed portion is provided fixed to the second right side surface. The pivoting portion is connected to the lower end of the fixed portion, and is pivotally connected to the fixed portion. The movable casing is fixed to the shaft of the pivoting portion. Note that the movable casing is provided between the first right side surface and the shaft of the pivoting portion. The protruding portion is provided on the lower end side of the pivoting portion, and the terminals are provided on the protruding portion. Note that also in this variation, as in the embodiment described above, the terminals are provided on the opposing surface of the protruding portion (i.e., the surface that opposes the body section).

Note that in the variation described above, when the second left controller 6 is attached to the main body apparatus 2, the lower end of the pivoting portion is inserted into the insertion hole at the upper end of the main body rail member 29 of the main body apparatus 2. Also in the variation described above, as in the embodiment described above, by aligning the slide axis of the pivoting portion and the slide axis of the fixed portion on the same straight line, the slide member of the second left controller 6 can be inserted into the main body rail member 29, and the second left controller 6 can be attached to the main body apparatus 2.

(Variation Regarding Configuration of Slide Member)

In other embodiments, the slide member of the second controller may be configured without the pivoting portion so that the shape thereof cannot be changed. Then, as in the embodiment described above, the front surface of the body section of the second controller may include the non-inclined surface 301a and the inclined surface 301b, or may include an upwardly-protruding curved surface as in the first variation described above. The slide member is provided so that a portion thereof protrudes past the front surface of the body section as seen from the direction perpendicular to the side surface of the body section. Note that the body section does not need to include the grip portion on the reverse surface thereof. With the configuration described above, as in the embodiment described above, it is possible to make it easy to hold the body section, and it is possible to provide a controller that is easy to hold.

The embodiment described above is applicable to a game controller, for example, with the aim of, for example, improving the degree of freedom in designing the shape of the controller.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A game controller which is removably attachable to a main unit having a main unit-side slide member and configured to execute game processes, the game controller comprising:
   an operation section; and
   a controller-side slide member configured to slidably engage with the main unit-side slide member in a slide direction, wherein:
   the controller-side slide member has a first end and a second end in the slide direction;
   the game controller is configured to be attached to the main unit by inserting the controller-side slide member into the main unit-side slide member from the first end; and
   the controller-side slide member includes:
      a fixed portion that protrudes from a surface of the game controller and is fixed to the surface; and
      a pivoting portion that is connected to the fixed portion and is configured to pivot relative to the fixed portion.

2. The game controller according to claim 1, wherein the pivoting portion is configured to pivot to a first position in which a slide axis of the pivoting portion is substantially on the same straight line with a slide axis of the fixed portion.

3. The game controller according to claim 1, wherein the pivoting portion is configured to pivot to a first position in which the fixed portion and the pivoting portion are configured to engage at the same time with the main unit-side slide member.

4. The game controller according to claim 2, wherein:
   the pivoting portion is configured to pivot over a range including an extent from the first position to a second position in which the slide axis of the pivoting portion is inclined relative to the slide axis of the fixed portion; and
   the game controller further comprises a biasing portion that biases the pivoting portion in one of a pivoting direction from the first position toward the second position and a pivoting direction from the second position toward the first position.

5. The game controller according to claim 2, wherein:
   the pivoting portion is configured to pivot over a range including an extent from the first position to a second position in which the slide axis of the pivoting portion forms an angle other than a straight angle relative to the slide axis of the fixed portion; and the game controller further comprises a biasing portion that biases the pivoting portion in a pivoting direction from the first position toward the second position or in a pivoting direction from the second position toward the first position.

6. The game controller according to claim 1, further comprising a holding portion that holds the pivoting portion in a hold position.

7. The game controller according to claim 1, further comprising a holding portion that holds the pivoting portion in a second position in which a slide axis of the pivoting portion is inclined relative to a slide axis of the fixed portion.

8. The game controller according to claim 1, further comprising a holding portion that holds the pivoting portion in a second position in which a slide axis of the pivoting portion forms an angle other than a straight angle relative to a slide axis of the fixed portion.

9. The game controller according to claim 1, further comprising a first restricting portion that restricts the pivot of the pivoting portion at a second position in which a slide axis of the pivoting portion is inclined relative to a slide axis of the fixed portion.

10. The game controller according to claim 1, further comprising a second restricting portion that restricts the pivot of the pivoting portion at a first position in which a slide axis of the pivoting portion is substantially on the same straight line with a slide axis of the fixed portion.

11. The game controller according to claim 1, wherein:
the surface from which the fixed portion protrudes is a side surface of a body section of the game controller; and
a front surface of the body section includes:
a first plane on which the operation section is provided; and
a second plane that is not parallel to the first plane.

12. The game controller according to claim 11, wherein a connecting portion between the fixed portion and the pivoting portion is at a position corresponding to a boundary portion between the first plane and the second plane in the slide direction.

13. The game controller according to claim 11, wherein:
the fixed portion is on a side surface, of the side surface of the body section, that is located on a side of the second plane, wherein a slide axis of the fixed portion and the second plane are substantially parallel to each other; and
the pivoting portion is:
along a side of the first plane; and
configured to pivot between a first position in which a slide axis of the pivoting portion is substantially on the same straight line with a slide axis of the fixed portion and a third position that is reached when the pivoting portion pivots in such a direction that an amount by which the pivoting portion protrudes from the first plane of the body section decreases from an amount of protrusion of the pivoting portion in the first position.

14. The game controller according to claim 13, wherein the third position is a position in which the pivoting portion is on a back surface side relative to the first plane of the body section.

15. The game controller according to claim 1, wherein:
the surface from which the fixed portion protrudes is a side surface of a body section of the game controller;

a front surface of the body section is bent or curved; and
the operation section is on the front surface of the body section.

16. The game controller according to claim 15, wherein a connecting portion between the fixed portion and the pivoting portion is at a position corresponding to a portion in the slide direction at which the body section is bent or curved.

17. The game controller according to claim 11, wherein the fixed portion is on a side surface, of the side surface of the body section, that is located on a side of the second plane, wherein a slide axis of the fixed portion and the second plane are substantially parallel to each other.

18. The game controller according to claim 11, wherein the fixed portion is on a back surface side relative to the front surface of the body section.

19. The game controller according to claim 15, wherein the pivoting portion is configured to pivot between a first position in which a slide axis of the pivoting portion is substantially on the same straight line with a slide axis of the fixed portion and a fourth position that is reached when the pivoting portion pivots in such a direction that an amount by which the pivoting portion protrudes from the front surface of the body section decreases from an amount of protrusion of the pivoting portion in the first position.

20. The game controller according to claim 19, wherein the fourth position is a position in which the pivoting portion is on a back surface side relative to the front surface of the body section.

21. The game controller according to claim 1, wherein the pivoting portion is configured to pivot about an axis that is substantially perpendicular to the surface from which the fixed portion protrudes.

22. The game controller according to claim 1, wherein:
the controller-side slide member further includes a shaft on an end portion of the fixed portion in the slide direction; and
the pivoting portion is configured to pivot about the shaft.

23. The game controller according to claim 1, further comprising a stop member on the pivoting portion that resists a slide movement of the controller-side slide member against the main unit-side slide member in a direction opposite to a direction in which the controller-side slide member is inserted into the main unit-side slide member when the controller-side slide member has been inserted up to a predetermined position into the main unit-side slide member.

24. The game controller according to claim 23, further comprising a movable member on the pivoting portion that is configured to be moved by an operation by a user, wherein the stop member is moved from a fourth position to a fifth position in response to the movable member being operated by the user, wherein:
the stop member in the fourth position is more protruding from at least one of the surface, from which the fixed portion protrudes, of the game controller and a side surface of the controller-side slide member as compared with the stop member in the fifth position; and
the stop member is biased toward a protruding state in the fourth position.

25. The game controller according to claim 1, further comprising an operation section provided on the pivoting portion.

26. The game controller according to claim 1, wherein:
the fixed portion is on a side of the first end of the controller-side slide member, and the pivoting portion is on a side of the second end of the controller-side slide member; and
the fixed portion includes:
  a protruding portion protruding in the slide direction from the side of the first end of the fixed portion and having a facing surface that faces the surface, from which the fixed portion protrudes, of the game controller; and
at least one terminal between the facing surface and the surface from which the fixed portion protrudes, wherein the terminal is configured to be electrically connected to the main unit.

27. The game controller according to claim 1, wherein:
the fixed portion is on a side of the second end of the controller-side slide member, and the pivoting portion is on a side of the first end of the controller-side slide member;
the pivoting portion includes:
  a protruding portion protruding in the slide direction from the side of the second end of the pivoting portion and having a facing surface that faces the surface, from which the fixed portion protrudes, of the game controller; and
at least one terminal between the opposing surface and the surface from which the fixed portion protrudes, wherein the terminal is configured to be electrically connected to the main unit.

28. A game controller which is removably attachable to a main unit having a main unit-side slide member and configured to execute game processes, the game controller comprising:
  an operation section; and
  a controller-side slide member protruding from a surface of the game controller and configured to slidably engage with the main unit-side slide member in a slide direction, wherein:
  the controller-side slide member has a first end and a second end in the slide direction;
  the game controller is configured to be attached to the main unit by inserting the controller-side slide member into the main unit-side slide member from the first end;
  the surface is a side surface of a body section of the game controller; and
  the front surface of the body section includes:
    a first surface on which the operation section is provided; and
    a second surface that is not parallel to the first surface; and
    a portion of the controller-side slide member protrudes past the front surface of the body section as seen from a direction perpendicular to the side surface.

29. A game controller which is removably attachable to a main unit having a main unit-side slide member and configured to execute game processes, the game controller comprising:
  an operation section; and
  a controller-side slide member protruding from a surface of the game controller and configured to slidably engage with the main unit-side slide member in a slide direction, wherein:
  the controller-side slide member has a first end and a second end in the slide direction;
  the game controller is configured to be attached to the main unit by inserting the controller-side slide member into the main unit-side slide member from the first end;
  the surface is a side surface of a body section of the game controller;
  a front surface of the body section includes an upwardly-protruding curved surface on which the operation section is provided; and
  a portion of the controller-side slide member protrudes past the front surface of the body section as seen from a direction perpendicular to the side surface.

30. A game controller which is removably attachable to a main unit having a main unit-side slide member and configured to execute game processes, the game controller comprising:
  an operation section; and
  a controller-side slide member protruding from a surface of the game controller and configured to slidably engage with the main unit-side slide member in a slide direction, wherein:
  the controller-side slide member has a first end and a second end in the slide direction;
  the game controller is configured to be attached to the main unit by inserting the controller-side slide member into the main unit-side slide member from the first end;
  the surface is a side surface of a body section of the game controller;
  the front surface of the body section includes:
    a first surface on which the operation section is provided; and
    a second surface that is not parallel to the first surface; and
  a reverse surface of the body section includes:
    a third surface; and
    an upwardly-protruding fourth surface that protrudes from the third surface and is configured to be held by a hand of a user.

* * * * *